United States Patent
Horimai

(10) Patent No.: US 7,321,541 B2
(45) Date of Patent: Jan. 22, 2008

(54) INFORMATION RECORDING METHOD, REPRODUCING METHOD, AND RECORDING/REPRODUCING METHOD UTILIZING HOLOGRAPHY

(75) Inventor: Hideyoshi Horimai, Yokohama (JP)

(73) Assignee: Optware Corporation, Kanagawa (JP)

(*) Notice: Subject to any disclaimer, the term of this patent is extended or adjusted under 35 U.S.C. 154(b) by 0 days.

(21) Appl. No.: 10/530,942

(22) PCT Filed: Oct. 9, 2003

(86) PCT No.: PCT/JP03/12955

§ 371 (c)(1),
(2), (4) Date: Apr. 8, 2005

(87) PCT Pub. No.: WO2004/034387

PCT Pub. Date: Apr. 22, 2004

(65) Prior Publication Data

US 2006/0050544 A1    Mar. 9, 2006

Related U.S. Application Data

(60) Provisional application No. 60/417,484, filed on Oct. 9, 2002.

(51) Int. Cl.
*G11B 7/00*    (2006.01)

(52) U.S. Cl. .................................................... 369/103
(58) Field of Classification Search .................. None
See application file for complete search history.

(56) References Cited

U.S. PATENT DOCUMENTS

| | | | | |
|---|---|---|---|---|
| 5,511,058 A | * | 4/1996 | Visel et al. | 369/103 |
| 5,808,998 A | * | 9/1998 | Curtis et al. | 369/103 |
| 5,917,798 A | * | 6/1999 | Horimai et al. | 369/103 |
| 6,697,316 B2 | * | 2/2004 | Burr | 369/103 |

FOREIGN PATENT DOCUMENTS

JP    07152095 A  *  6/1995

* cited by examiner

*Primary Examiner*—Thang V. Tran
*Assistant Examiner*—Christopher Lamb
(74) *Attorney, Agent, or Firm*—William L. Androlia; H. Henry Koda

(57) ABSTRACT

A method for recording information on a recording medium utilizing an interference pattern by interference between an information light modulated spatially with digital pattern information displayed on a spatial light modulator having multiple pixels and a reference light for recording. In order to provide a novel recording method capable of enhancing the recording density and the transfer rate furthermore, digital information to be recorded is represented by match/mismatch of the attributes of adjacent pixels in the spatial light modulator to produce digital pattern information.

14 Claims, 14 Drawing Sheets

(A) 
(D) 
(G) 
(B) 
(E) 
(H) 
(C) 
(F) 
(I)

(A)

(B)

(C)

At the time of recording

PRIOR ART

INFORMATION RECORDING METHOD, REPRODUCING METHOD, AND RECORDING/REPRODUCING METHOD UTILIZING HOLOGRAPHY

BACKGROUND OF THE INVENTION

1. Field of the Invention

The present invention relates to an optical information recording method for recording information to an optical information recording medium through the use of holography, an optical information reproduction method for reproducing information from an optical information recording medium through the use of holography, and an optical information recording/reproduction method for recording information to an optical information recording medium and reproducing information from an optical information recording medium through the use of holography.

2. Description of the Related Art

Optical information recording/reproduction wherein information is recorded to and reproduced from an optical information recording medium through the use of holography has been implemented conventionally. In general, holographic recording for recording information to a recording medium through the use of holography is performed by superimposing information light which carries image information onto reference light within the recording medium and writing an interference pattern generated as a result to the recording medium. When reproducing the recorded information, a reproduction light which carries image information is reproduced by diffraction due to interference pattern, by irradiating the recording medium with reference light.

In recent years, volume holography, digital volume holography in particular, has been developed and is attracting attention in practical fields for ultra-high density optical recording. Volume holography is a system wherein an interference pattern is written three-dimensionally by making positive use of the recording medium in a direction of its thickness as well, and is characterized in that diffraction efficiency can be enhanced by increasing thickness and recording capacity can be increased by utilizing multiplex recording. Digital volume holography is a computer-oriented holographic recording system which, while using the same recording medium and recording system as in the volume holography, limits the image information to be recorded to a binary digital pattern. In digital volume holography, even analog image information such as a picture, for example, is once digitalized and developed into two-dimensional pattern information (also referred to as two-dimensional digital page data), which is then carried by information light, allowed to interfere with reference light, and recorded as a hologram. For reproduction, this digital pattern information is read and decoded to restore the original image information for display. Therefore, even if the SN ratio (signal-to-noise ratio) during reproduction is poor, the original information can be reproduced with extremely high-fidelity by performing differential detection or error correction on binary data which has been encoded.

In conventional optical recording/reproducing devices, two-dimensional digital pattern information is displayed in a spatial light modulator (may be abbreviated as SLM) which has a large number of pixels arranged in a grid, and information light carrying the two-dimensional digital pattern information is generated by changing the state of the light, such as the phase, intensity, and wavelength, per pixel with the spatial light modulator. What is actually written to the recording medium is not the two-dimensional digital pattern information per se, but the interference pattern of information light and reference light.

In addition, the encoding method for two-dimensional digital pattern information conventionally expresses one-bit digital information, "0" or "1", by two pixels in the spatial light modulator, and invariably, one pixel out of the two pixels corresponding to the one-bit information is "ON" and the other, "OFF". If both of the two pixels are either ON or OFF, it becomes an error data. Thus, expressing one-bit digital information by two pixels can increase detection accuracy of the data through differential detection.

Generally, in the information storage field, recording density and transfer rate are important factors. In digital volume holography, high recording density and high transfer rate have been realized by the following methods.

First, the recording capacity per volume, namely recording density, can be enhanced by performing multiplex recording of two-dimensional digital pattern information in a volume recording medium. Next, the number of bits recorded or reproduced per second which is determined by (the number of vertical pixels in the two-dimensional digital pattern information)×(the number of horizontal pixels)×(the number of frames), namely the transfer rate, can be increased by improving the frame rate (the speed by which pixels are displayed or display is detected) of the spatial light modulator which displays the two-dimensional digital pattern information and the detector which detects the reproduced two-dimensional digital pattern information, when recording information.

For example, Japanese Patent Laid-Open Publication No. 11-311937 describes techniques such as phase encoding multiplexing wherein a plurality of information are superimposed and recorded by changing phasing signals, hole burning-type wavelength multiplexing wherein a plurality of information are superimposed and recorded by changing wavelengths, shift multiplexing wherein a plurality of interference areas are arranged so as to be out of alignment to each other in a horizontal direction and partially overlapping, and a plurality of information are superimposed and recorded, as multiplex recording in an optical recording reproduction device which utilizes digital volume holography.

SUMMARY OF THE INVENTION

However, further improvement in recording density and transfer rate is important even in the field of digital volume holography, and the following approaches have been reviewed.

If the number of pixels per two-dimensional page data displayed in the spatial light modulator is increased, recording density is enhanced and recording capacity can be increased if the multiplicity of multiplex recording is the same, because information quantity per recording hologram is increased. Furthermore, if the frame rate of the spatial light modulator is the same, transfer rate is also improved. In addition, the so-called code rate can be improved, data conversion efficiency can be enhanced, and recording capacity can be increased by improving the modulation system or the coding system for the two-dimensional page data.

However, there are various inhibiting factors to these approaches. First, if the aperture of an object lens is enlarged to increase the number of pixels per two-dimensional page data, the lens becomes heavier, stronger power is required to drive the optical system such as the focus, tracking servo, and asking servo, and because inertial force is also greater, quick movement becomes difficult. In addition, miniaturization of the optical system is obstructed because increasing the aperture of the object lens means increasing the diameter of the beam. Furthermore, the increase in the diameter of the beam is problematic in the slimming-down of devices, as well.

Although the number of pixels per two-dimensional page data can be increased if the pixel pitch of the spatial light modulator is made finer, spatial frequency increases when the pixel pitch becomes smaller. If it is assumed that the wavelength of the laser is $\lambda$, the focal distance of the object lens is f, and the pixel pitch of the spatial light modulator is D, the order d of the diffraction is $d=\lambda \times f/D$, which indicates that spatial frequency increases if the pixel pitch becomes smaller. An increase in spatial frequency means that the hologram formed when light is concentrated by the object lens is enlarged, and as a result, effect contributing to the enhancement of recording density is weakened because the occupied area per recorded hologram widens.

Although it seems that recording density will be enhanced by the effect of multiplex recording if the distance between holograms is set to the same as that in the conventional method in spite of the widened occupied area per recorded hologram, superimposed areas become wider because the size of the hologram is larger and multiplicity is increased. Therefore, if the same recording medium as in the conventional method is used (if M number indicating the limit value of multiplex recording determined by the material of the recording medium is the same), diffraction efficiency at the time of the reproduction decreases and the effect on recoding density enhancement is limited from an SN ratio perspective.

Recording density is further lowered through encoding. For example, in the differential detection method which is the afore-mentioned conventional encoding method, recording density is further decreased by half because one-bit digital information is expressed by using two pixels. In other words, the code rate of the differential detection method is 50%. FIG. 14(B) is a digital pattern information wherein digital information is encoded by the conventional differential detection method and is displayed through the attribute of the pixels in the spatial light modulator. In FIG. 14(B), the two pixels express one piece of, digital information. Digital information "0" is expressed if the left side of the two pixels is black and the right side is white, and digital information "1" is expressed if the right side of the two pixels is black and the left side is white. The digital pattern information in FIG. 14B expresses 8-bit (1 byte) digital information which is "01100101". In the display method in FIG. 14(B), the white rate in the spatial light modulator (the percentage of one attribute (white pixels)) is always 50% and is constant. Generally, this is used when an error correction code (ECC) is added. Data added to actual data is called an overhead, and if this overhead is used in a broad sense, the overhead in the afore-mentioned differential detection method is 50%.

If digital information "1" is displayed as ON by setting the pixel in the spatial light modulator OFF to display digital information "0" in the dimensional digital pattern information without encoding, the overhead is 0% and the code rate is 100%. FIG. 14(A) is a digital pattern information wherein digital information which is recorded without encoding is displayed as is through the attribute of the pixels in the spatial light modulator. In FIG. 14(A), the black pixel expresses digital information "0" and the white pixel expresses the digital information "1". The digital pattern information in FIG. 14(A) expresses 8-bit (1 byte) digital information which is "01100101", repeated twice. In the display method in FIG. 14 (A), the white rate of the spatial light modulator varies from 0 to 100%.

However, in this method, if the same digital information was successive, the holograms in the recording medium became uneven and high SN ratio recording difficult, because pixel pitch D superficially became greater and the distribution of spatial frequency uneven due to successive OFF pixel or ON pixel. Furthermore, since light intensity from information light varied with the total number of digital information "1", the ratio of information light and reference light could not be kept constant, and therefore, recording wherein the information light and reference light ratio varies with each hologram had to be performed. In addition, due to the lack of modulation rules, error correction processing becomes extremely difficult and the multiplicity of multiplex recording cannot be increased if the SN ratio of the reproduction signal is lowered, and therefore, recording density is inevitably decreased. Thus, the realization of a method for displaying information without encoding is almost impossible.

Next, a so-called over-sampling method, wherein one pixel of the spatial light modulator is enlarged to 2×2 pixels or 3×3 pixels of a CMOS sensor, which is a detector used for reproduction, to suppress the movement of the two-dimensional digital pattern information in the X direction or the Y direction due to optical distortion of the two-dimensional digital pattern information or distortion of the recording medium, is used for the reproduction of conventional holographic recordings. However, in the over-sampling method, because the CMOS sensor required 4 or 9 pixels, this was equivalent to the CMOS sensor merely performing ¼ or ⅑ its inherent performance and the frame rate could not be increased to a high speed.

Furthermore, the transfer rate is also lowered by encoding. For example, in the afore-mentioned differential detection method, the transfer rate was further halved because two pixels were used to express one piece of digital information.

The objective of the present invention is to provide a new recording method, a reproduction method, and a recording/reproduction method which can solve the afore-mentioned, deeply-intertwined problems in digital volume holography. Moreover, the objective of the present invention is to further improve recording density and transfer rate.

[Means for Solving the Problems]

In order to achieve the afore-mentioned objectives, the information recording method according to the present invention is the method wherein information is recorded in a recording medium by utilizing interference pattern formed by interference of information light, which is spatially modulated by digital pattern information displayed in a spatial light modulator which has a large number of pixels, and reference light for recording and is characterized in that the digital information that is recorded is digital pattern information and expressed by the matching or the mismatching of the attributes between adjacent pixels in the spatial light modulator.

Furthermore, in the information recording method according to the present invention, it is preferable that digital pattern information is displayed by a plurality of pixels arranged in one dimension of the spatial light modulator. In addition, in the information recording method according to the present invention, the spatial light modulator may have a large number of pixels arranged as a grid and may combine a plurality of digital pattern information expressed by a plurality of the pixels arranged in one dimension to display as two-dimensional pattern information.

Still further, in the information recording method according to the present invention, it is preferable that the digital pattern information is such that a pixel whose attribute does not match that of one adjacent pixel is displayed so as to invariably have a pixel whose attribute matches on the other end, and it is more preferable that the digital pattern information is such that the pixel whose attribute does not match that of one adjacent pixel is displayed so as to invariably have a certain number or more of consecutive pixels whose attributes match on the other sides.

In addition, the information reproduction method according to the present invention is a method wherein information is reproduced from a recording medium wherein information is recorded by utilizing interference pattern formed by interference of information light, which is spatially modulated by digital pattern information displayed in a spatial light modulator which has a large number of pixels, and reference light for recording, and is characterized in that the reproduction light which carries digital pattern information is generated by irradiating the recording medium with reference light for reproduction and the matching and mismatching of the attributes of adjacent pixels in the digital pattern information of the reproduction light are detected.

Furthermore, in the information reproduction method according to the present invention, it is preferable that the detector for detecting reproduction light has a plurality of pixels and the pixels of the detector are disposed on the borders of the adjacent pixels in the digital pattern information.

Still further, in the information reproduction method according to the present invention, it is preferable that the digital pattern information of the reproduction light is expressed by a plurality of pixels disposed arranged in one dimension of the spatial light modulator.

In addition, the information recording/reproducing method according to the present invention is a method wherein information is recorded to a recording medium by utilizing interference pattern formed by interference of information light, which is spatially modulated by digital pattern information displayed in a spatial light modulator which has a large number of pixels, and reference light for recording, and information is reproduced from a recording medium to which information is recorded, and is characterized in that the digital information that is recorded is digital pattern information and expressed by the matching or the mismatching of the attributes between adjacent pixels in the spatial light modulator, the reproduction light which carries digital pattern information is generated by irradiating the recording medium with reference light for reproduction, and the matching and mismatching of the attributes of adjacent pixels in the digital pattern information of the reproduction light are detected.

Furthermore, in the information recording/reproducing method according to the present invention, it is preferable that the digital pattern information is displayed by a plurality of pixels disposed in one dimension of the spatial light modulator. In addition, in the information recording/reproducing method according to the present invention, the spatial light modulator may have a large number of pixels arranged as a grid and may combine a plurality of digital pattern information expressed by a plurality of the pixels arranged in one dimension to display as two-dimensional pattern information.

Still further, in the information recording/reproducing method according to the present invention, it is preferable that the digital pattern information is such that a pixel whose attribute does not match that of one adjacent pixel is displayed so as to invariably have a pixel whose attribute matches on the other end, and it is more preferable that the digital pattern information is such that the pixel whose attribute does not match that of one adjacent pixel is displayed so as to invariably have a certain number or more of consecutive pixels whose attributes match on the other sides.

Still further, in the information recording/reproducing method, it is preferable that the detector for detecting reproduction light has a plurality of pixels and the pixels of the detector are disposed on the borders of the adjacent pixels in the digital pattern information.

In addition, the information recording method according to the present invention is a method wherein information is recorded in a recording medium by utilizing interference pattern formed by interference of information light, which is spatially modulated by digital pattern information displayed in a spatial light modulator which has a large number of pixels arranged in a grid, and reference light for recording, and is characterized in that the digital information that is recorded is digital pattern information and expressed by the allocation of pixel groups comprising a succession of a plurality of pixels whose attributes are match each other within a predetermined area of the spatial light modulator.

Furthermore, in the information recording method according to the present invention, it is preferable that plural pixel groups are allocated to the predetermined area.

DESCRIPTION OF THE PREFERRED EMBODIMENTS

Figure 1:
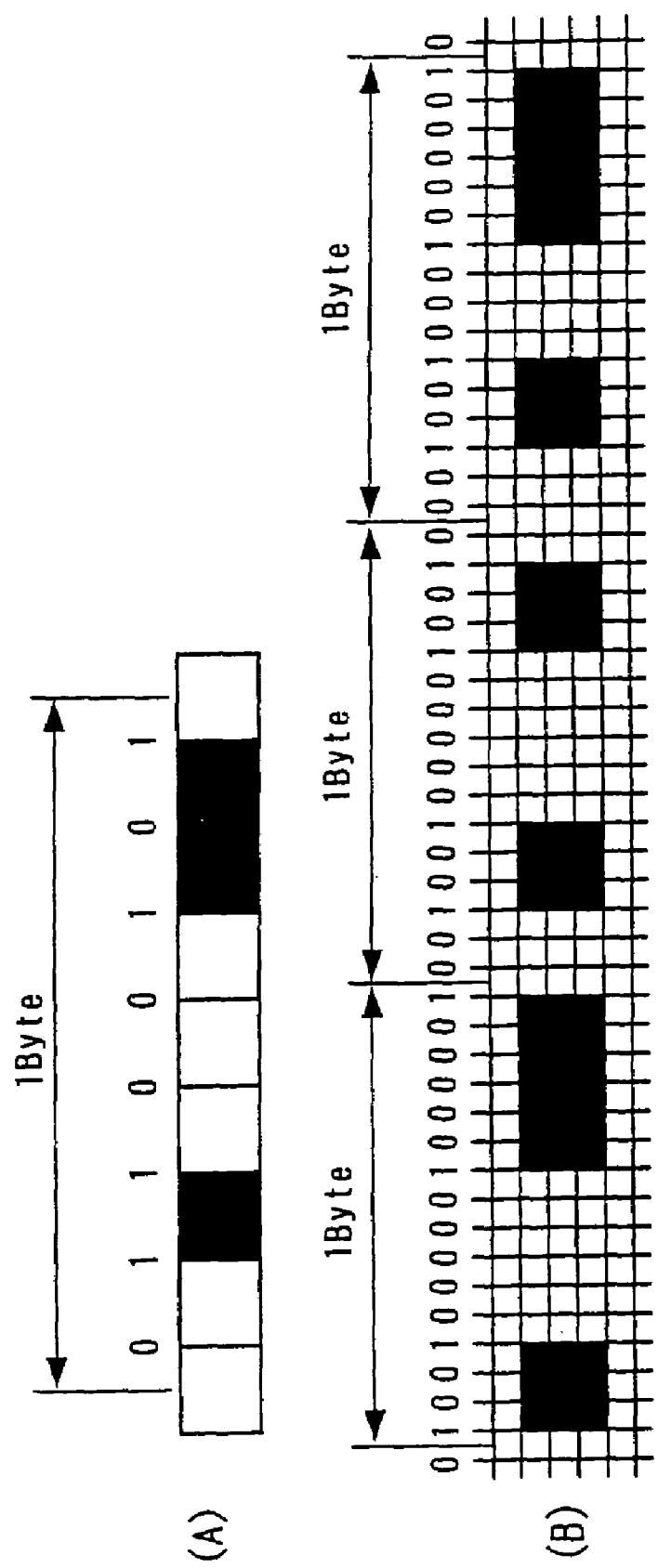
FIG. 1(A) and (B) are examples of digital pattern information according to the present invention.

A recording method and digital pattern information displayed in a spatial light modulator are described below. Liquid crystal display panels, DMD (Digital Micromirror Device) and the like can be used as spatial light modulators.

FIG. 1(A) is digital pattern information which is digital information expressed by the matching or mismatching of the attributes of adjacent pixels in a method according to the present invention and displayed in the spatial light modulator. In FIG. 1(A), if the attributes of the adjacent pixels do not match each other, digital information "0" is expressed, and if the attributes of the adjacent pixels match each other, digital information "1", is expressed. The relation of the attribute and the correspondence of the digital information can be reversed. FIG. 1(A) expresses an 8-bit (1 byte) digital information which is "01100101". Namely, the attributes the first and second pixels from the left in FIG. 1(A) are both white, expressing digital information "0", and the second and third pixels from the left express digital information "1" because the attributes are white and black and mismatching. Furthermore, the third and fourth pixels from the left express digital information "1" because the attributes are black and white and mismatching, and likewise, the forth and fifth pixels express digital information "0" because the attributes are white and matching, the fifth and sixth pixels also express digital information "0" because the attributes are white and matching, the sixth and seventh pixels express digital information "1" because the attributes are black and white and mismatching, the seventh and eighth pixels express digital information "0" because the attributes are black and matching, and finally, the eighth and ninth pixels express the digital information "1" because the attributes are black and white and mismatching.

Thus, in an expression method according to the present invention, digital information is displayed not by the attribute of the pixel per se, but by the matching and mismatching of the attribute of a pixel with that of an adjacent pixel. The attribute of the pixel is the state of light modulated by the relevant pixel. If the spatial light modulator modulates the intensity of the light, for example, a combination of the attributes for a transmitting state and a cutoff state can be used as the attributes of the pixels. If the phase of the light is modulated, for example, a combination of the attribute for advancing the phase of the light by half of a wavelength and the attribute which does not vary the phase of the light or a combination of the attribute for advancing the phase of the light by half of a wavelength and the attribute for delaying the phase of the light by half of a wavelength can be used. If the polarization direction of the light is modulated, a combination of the attribute for rotating the polarization direction by +450 and the attribute for rotating the polarization direction by −450 can be used.

Since digital information is expressed as is in FIG. 1(A), the borders of the pixels of the order of the digital information are required, and the digital information is shown by nine pixels. However, because the pixels at both ends do not use the other border, they can be used as adjacent digital pattern information if the digital pattern information is continuously displayed. As a result, one-byte digital information can be expressed in an 8-pixel area of the spatial light modulator, even in the expression method in FIG. 1(A).

Furthermore, the pixel pitch of the spatial light modulator can be made smaller without increasing spatial frequency by utilizing this expression method. In order to do so, digital pattern information must be displayed so as to allow the pixel whose attribute does not match that of the adjacent pixel to invariably have a certain number or more of consecutive pixels whose attributes match on the other sides. If digital pattern information is thus displayed, this pixel plus the afore-mentioned certain number of pixels (hereinafter referred to as "continuous constant") are consecutive, at the very least. Because the light modulated by the consecutively aligned pixels of the same attribute is the same as the light modulated by one large pixel of the same dimension, spatial frequency of the modulated light is the same as that in the spatial light modulator of the large pixel pitch. In other words, in comparison with the conventional pixel pitch, spatial frequency remains unchanged even if the pixel pitch is made smaller to 1/continuous constant.

This digital pattern information is further described using FIG. 1(B). FIG. 1(B) is digital pattern information wherein the continuous constant displayed in the spatial light modulator is 3. In FIG. 1(B), the pixel pitch of the spatial light modulator is ⅓ that of the conventional spatial light modulator (see FIG. 14(A) and (B)). And, in FIG. 1(B), three or more pixels of the same attribute are invariably aligned consecutively. In FIG. 1(B), digital pattern information is displayed by a plurality of the pixels one-dimensionally aligned in a horizontal direction. Namely, because the digital information is displayed by the attributes of the pixels adjacent to each other in the horizontal direction, it is not necessary to align more than three pixels consecutively, in relation to the vertical direction, to become of the same size as the conventional pixel. If, in addition to the horizontal direction, digital information is expressed by the attribute of the pixels adjacent to each other in the vertical direction, as well, three or more consecutive pixels are aligned in the vertical direction.

In FIG. 1(B), one-byte digital information is expressed in a 16-pixel area in the horizontal direction, and 3-byte digital information is expressed as a whole. For the one-byte digital pattern information on the left side in FIG. 1(B), the pixels are aligned with attributes which are "white, black, black, black, white, white, white, white, white, white, black, black, black, black, black, black, white" in sequential order from the left to express digital information, "1001000001000001".

In addition, because the first and second pixels from the left are white and black and have mismatching attributes, it expresses digital information "1". In regards to the second pixel, two pixels of the same attribute continue on the side opposite to the first pixel whose attribute does not match. Therefore, a pixel group of black attributes of 3×3 are displayed by the second to fourth pixels. The size of this 3×3 pixel group is the same as a conventional one-pixel size, and thereby, the spatial frequency of the light that is modulated is the same as that of the conventional pixel. A further look at the diagram shows the fourth and fifth pixels from the left are black and white and the attributes mismatch. The pixels of the white attribute are consecutively aligned from the sixth to the tenth pixels on the left side of the fifth pixel, and thereby, a pixel group of white attributes of 6×3 in total is displayed and is the same as a conventional two-pixel size.

In addition, it is unnecessary for the number of consecutive pixels to be a multiple of 3 in order to correspond to the conventional pixel size. If four pixels continue, it is the same size as one conventional pixel+⅓ conventional pixel, and if five pixels continue, it is the same size as one conventional pixel+⅔ conventional pixel. In any case, because it is never smaller than the pixel group 3×3 which is the conventional one pixel size, spatial frequency does not increase and hologram size can be maintained.

In order to realize this display method, information that is recorded must be encoded into digital information based on certain rules. As stated above, if digital information "1" is displayed by mismatching attribute, the encoded digital information must be encoded based on the rule wherein two or more "0" are disposed between "1" and "1". As one encoding method such as this, there is a conversion method called "8-to-16 Modulation with RLL (2, 10) requirements" used for Digital Versatile Disc (DVD). This conversion method converts an 8-bit (1 byte) information into a 16-bit digital information under a rule wherein two to ten "0" are placed between "1" and "1" (standardized in European Computer Manufacturers Association (ECMA)-279). In this encoding method, overhead is 50% and code rate is also 50%.

Figure 14:
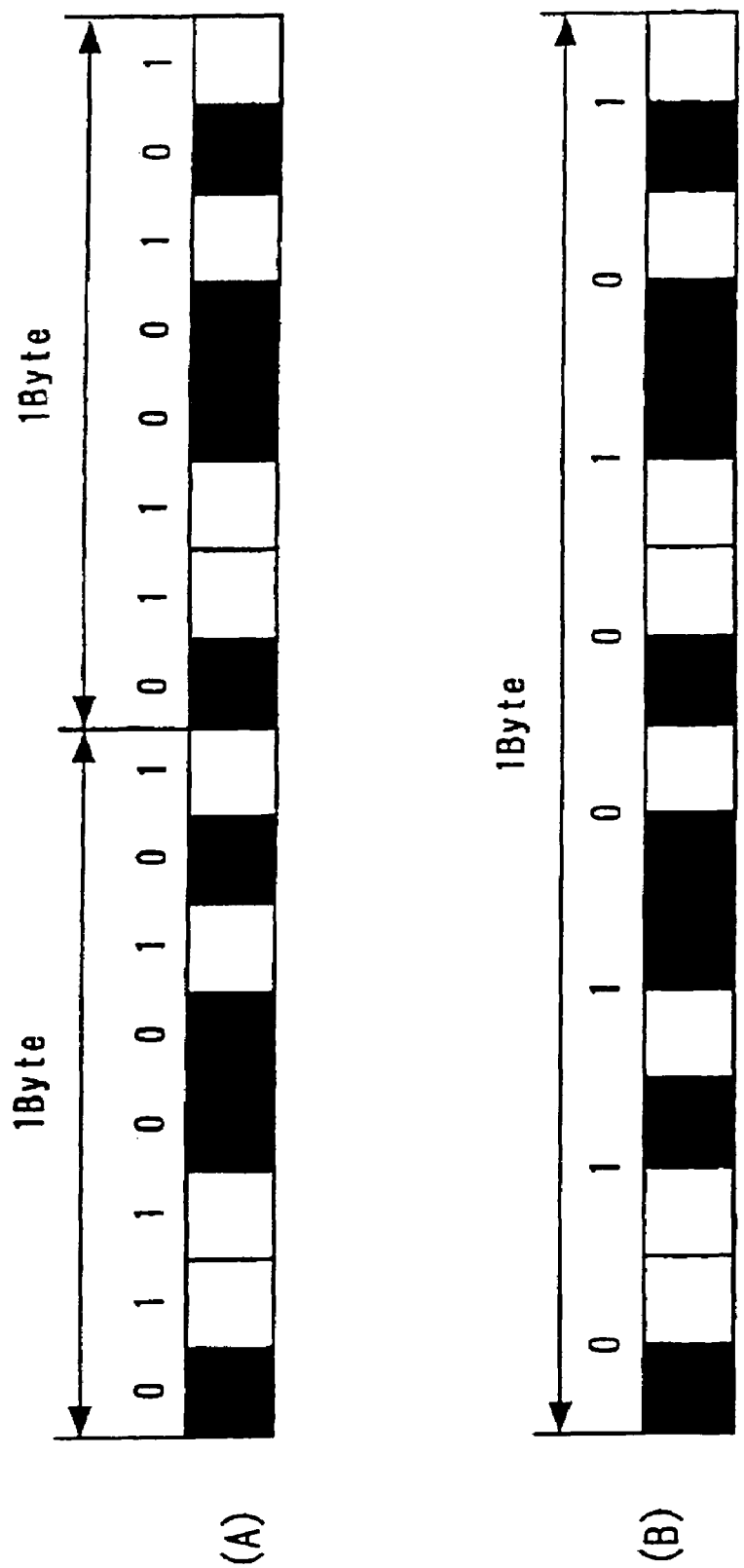
FIG. 14(A) and (B) are examples of conventional digital pattern information.

However, because the pixel pitch of the spatial light modulator can be decreased by ⅓, as stated above, recording density is increased to 1.5 times that of FIG. 14(B) which is not conventionally encoded, and increased to 3 times that of FIG. 14(A) of the differential detection method. In addition, if the rate of the two attribute is kept constant when encoding, the white rate can be kept constant.

Although the continuous constant was set to 3 in the example above, the continuous constant is not limited only to 3, and may be 2 or 4 or more. If the continuous constant is 2, the digital pattern information is displayed so that the pixel of an attribute which does not match that of one adjacent pixel invariably has consecutive pixels with matching attribute on the other side.

In addition, although FIG. 1(A) and (B) show one-dimensional digital pattern information, information can be displayed in the spatial light modulator as two-dimensional pattern information by combining the relevant digital pattern information. Although this will be explained hereafter, if each digital pattern information is displayed one-dimensionally, transfer rate can be increased at the time of reproduction.

As a method for reproducing information from the recording medium recorded as such, first, the recording medium is irradiated with reference light for reproduction to generate reproduction light which carries the digital pattern information which was carried by information light at the time of recording. Then, the matching and mismatching of the attributes of adjacent pixels in the digital pattern information carried by this reproduction light are detected and the digital information is reproduced. In order to detect the matching and mismatching of the attributes of adjacent pixels in the digital pattern information carried by reproduction light, the attribute of each pixel is detected by the detector, and thereafter, operation processing which compares the attributes of adjacent pixels can detect the matching and mismatching of attributes and obtain digital information. In addition, digital information can be obtained by arranging the pixels of the detector on the borders of the adjacent pixels of the digital pattern information and directly detecting the matching and mismatching of the attributes.

CMOS sensor or CCD sensor can be used as the detector. If the digital pattern information expressing one-byte digital information is expressed by a plurality of pixels disposed in one dimension of the spatial light modulator, one-byte digital information can be reproduced if the one-dimensional digital pattern information carried by the reproduction light is detected by the pixels, and therefore, the transfer rate can be improved even when reproducing. Because detection performed by pixels in grid-form is performed for every one line in the CMOS sensor and CCD sensor, one-byte digital information can be reproduced only after detections for several lines are completed if one-byte digital information is expressed by two-dimensional pattern information, because matching and mismatching of the attributes must also be detected in the vertical direction.

Figure 2:
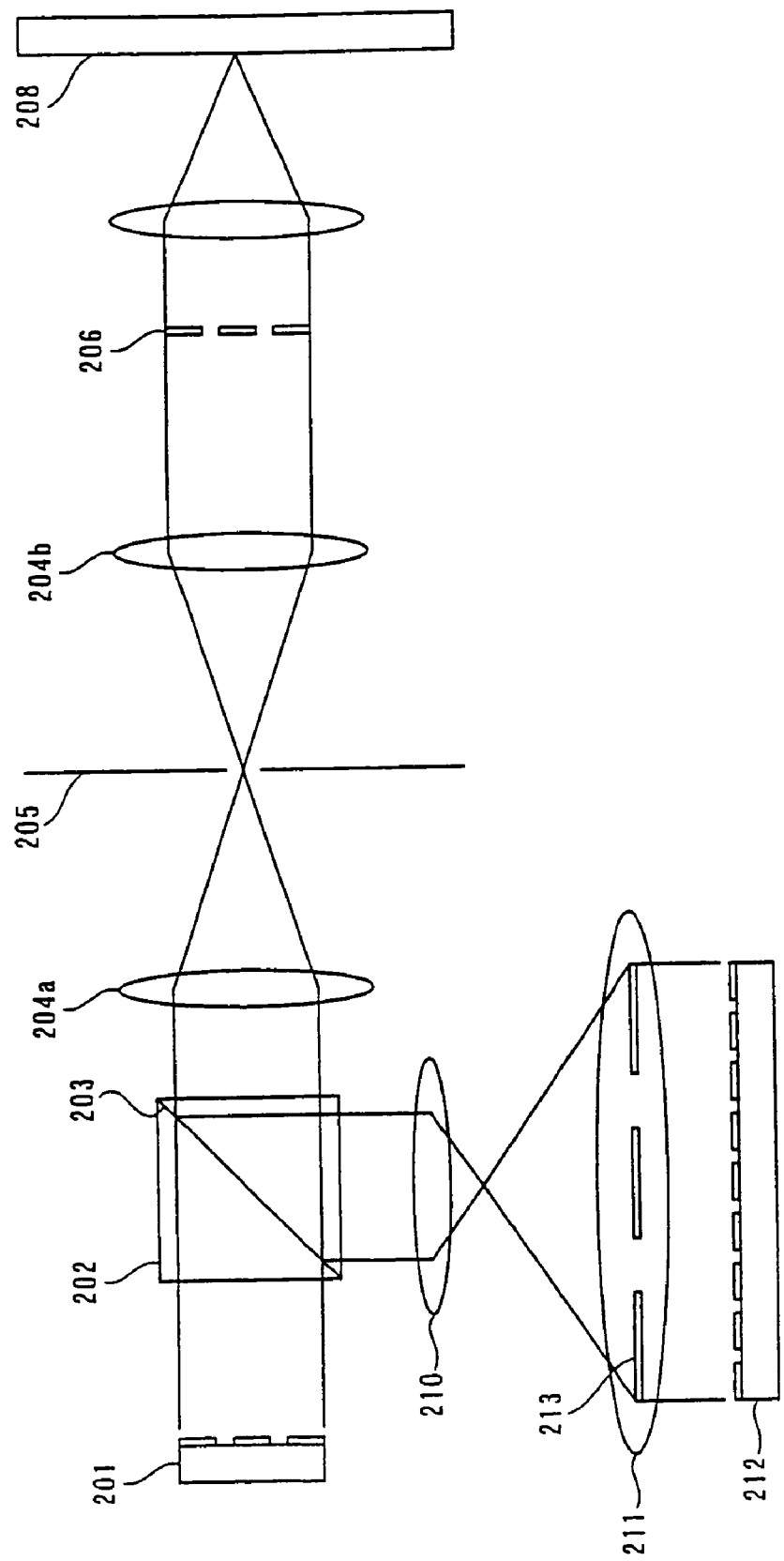
FIG. 2 is a schematic diagram of a part of an optical system in a conventional recording/reproducing device.

In order to adopt the recording method according to the present invention, the pixel pitch of the spatial light modulator must be smaller than that of the conventional one. FIG. 2 is a sectional view of the optical system from a conventional spatial light modulator 201 to a detector 212. In FIG. 2, information light and reference light emitted from spatial light modulator 201 passes through a half mirror 203 of a prism block 202, and passes through a pair of relay lenses 204a and 204b. A Nyquist aperture 205 for eliminating a higher frequency generated by the pixel pitch of the spatial light modulator is provided at the focal point between the relay lenses 204a and 204b. The light which passes through these optical systems produces the image of the digital pattern information displayed by the pixels of the spatial light modulator on an imaging surface 206. Then, the light is radiated to a recording medium 208 by an object lens 207. When reproducing, the reproduction light generated from recording medium 208 becomes a parallel light by object lens 207, passes through the relay lenses 204a and 204b, is reflected by the half mirror 203 of prism block 202, passes through lenses 210 and 211 and enters detector 212. Because the light is conventionally over-sampled by detector 212, the pixel size of digital pattern information 213 carried by the incident reproduction light is magnified by three by means of lenses 210 and 211.

Figure 3:
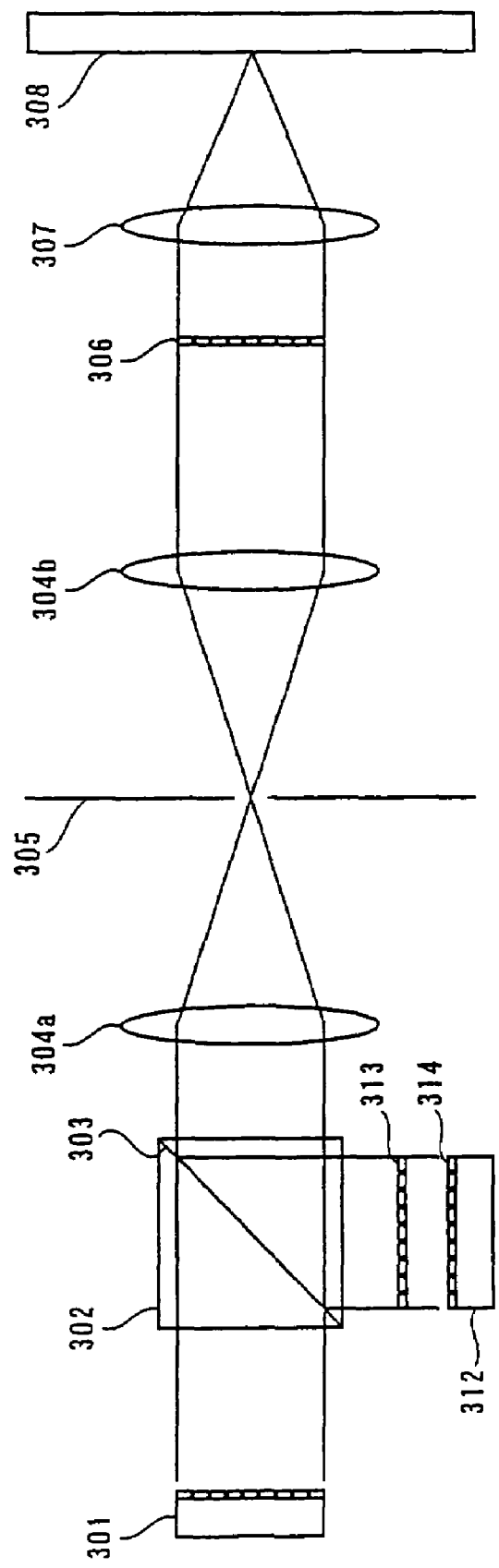
FIG. 3 is a schematic diagram of a part of an optical system in a recording/reproducing device according to the present invention.

First, in order to reduce the pixel pitch of the spatial light modulator to be smaller that of the conventional one, spatial light module with a smaller pixel than that of the conventional one may be used. FIG. 3 shows a sectional view of the optical systems from a spatial light modulator 301 to a detector 312 which can implement the recording method according to the present invention. The pixel pitch of the spatial light modulator in FIG. 3 is ⅓ of that of the conventional one. Here, if digital information is expressed by one-dimensional digital pattern information in the horizontal direction as shown in FIG. 1(B), the pixel pitches in the vertical and horizontal directions may be ⅓. Alternatively, only the pixel pitch in the horizontal direction may be ⅓, the pixel pitch in the vertical direction may be the same as that in the conventional one, and thus, it may be a longitudinally-shaped pixel.

In FIG. 3, information light and reference light emitted from the spatial light modulator 301 passes through a half mirror 303 of prism block 302, and passes though a pair of relay lenses 304a and 304b. A Nyquist aperture 305 for eliminating a higher frequency generated by the pixel pitch of the spatial light modulator is provided at the focal point between relay lenses 304a and 304b.

The light which passes through these optical systems produces the image of the digital pattern information displayed by the pixels of the spatial light modulator on an imaging surface 306. Then, the light is radiated to a recording medium 308 by an object lens 307. When reproducing, the reproduction light generated from recording medium 308 becomes a parallel light by object lens 307, passes through relay lenses 304a and 304b, is reflected by the half mirror 303 of prism block 302, and enters detector 312. In the recording method in FIG. 1(B), the pixel pitch is ⅓ that of the conventional one, and therefore, the number of the detected pixels triples. In FIG. 3, a detector 312 with the same pixel pitch as the spatial light modulator 301 is used.

Because the conventional detector performs over-sampling and the pixel pitch is ⅓ of the pixels of digital pattern information carried by the incident reproduction light, the same detector as in the conventional method can be used if it is not magnified by three times through the lens as in the conventional method and over-sampling is not performed.

In FIG. 3, detector 312 is placed so as to enable each pixel 314 to correspond to each pixel in the digital pattern information 313, one to one, detects the attributes of each pixel in the digital pattern information, and thereafter, obtains digital information by operation processing which compares the attributes of adjacent pixels. However, as shown in FIG. 4, the pixels of the digital pattern information 313 and the pixels 314 of the detector may be shifted by half of a pitch respectively and pixels 314 of the detector can be disposed on the border of the pixels to which the digital pattern information 313 is adjacent.

Next, in order to make the pixel pitch of the spatial light modulator smaller than that of the conventional, there is a method wherein the pixel pitch of the digital pattern information carried by the information light radiated to the recording medium is made smaller by utilizing the optical systems. FIG. 4 shows a sectional view of the optical systems from a spatial light modulator 401 to a detector 412 which can implement the recording method according to the present invention. In FIG. 4, although the pixel pitch of the spatial light modulator 401 is the same as in the conventional modulator, the size of the spatial light modulator is triple, both vertically and horizontally, that of the conventional. However, if, as shown in FIG. 1(B), digital information is expressed by one-dimensional digital pattern information in the horizontal direction, the size may be tripled both vertically and horizontally. However, the horizontal length may be tripled and the vertical length may be the same as in the conventional one, thereby configuring a longitudinal spatial light modulator.

Information light and reference light emitted from spatial light modulator 401 passes through a half mirror 403 of prism block 402 and is contracted by ⅓ vertically and horizontally by relay lenses 404a and 404b. A Nyquist aperture 405 for eliminating a higher frequency generated by the pixel pitch of the spatial light modulator is provided at the focal point between the relay lenses 404a and 404b. The light which passed through these optical systems produces an image contracted by ⅓ vertically and horizontally of the digital pattern information displayed by the pixels of the spatial light modulator on an image surface 406. Then, the light is radiated to a recording medium 408 by an object lens 407. When reproducing, the reproduction light generated from the recording medium 408 becomes a parallel light by object lens 407, passes through the relay lens 404a and 404b, is reflected by the half mirror 403 of prism block 402, and enters detector 412. If prism block 402 is inserted between lens 404b and object lens 407, a prism block which is the same size as that of the conventional one can be used, thereby enabling miniaturization of the optical systems.

Figure 4:
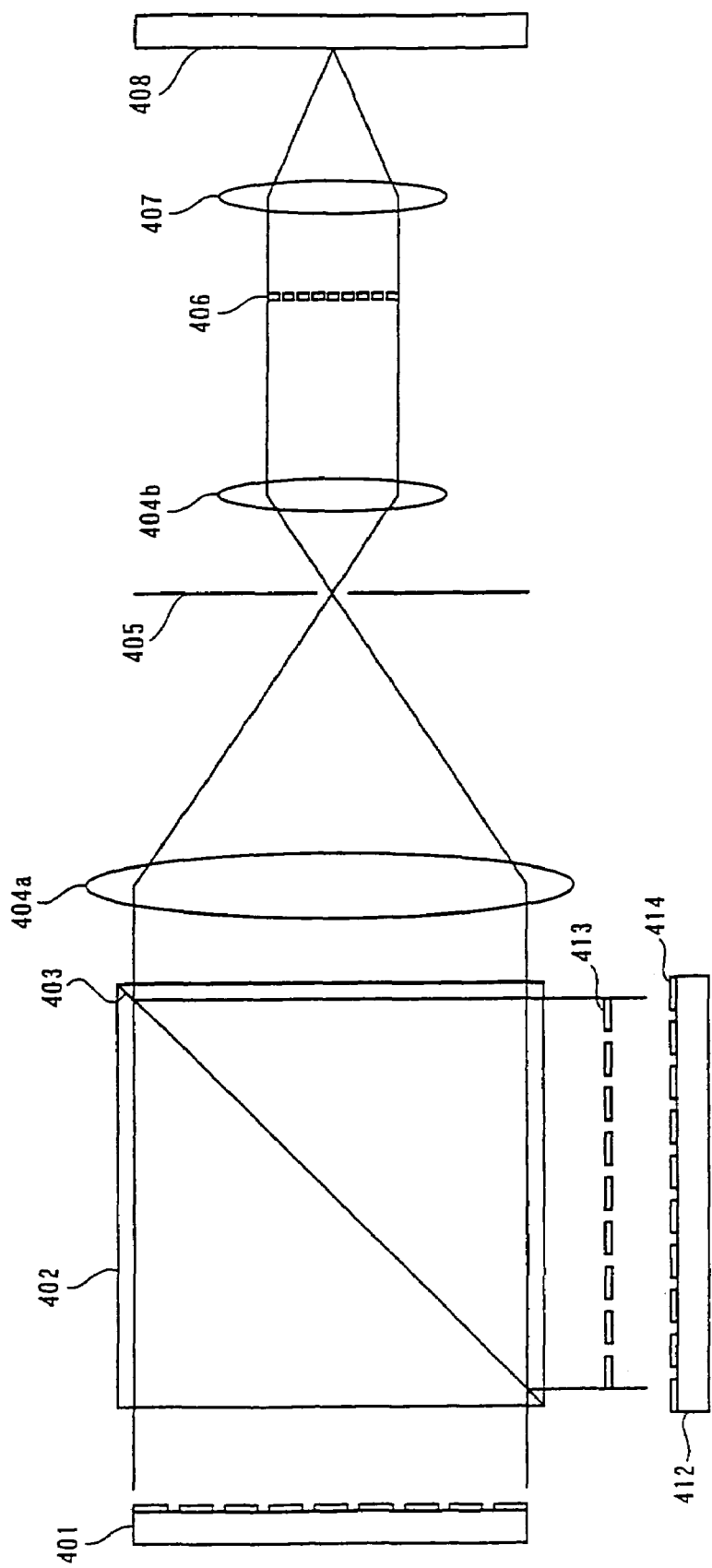
FIG. 4 is a schematic diagram of a part of the optical system in the recording/reproducing device according to the present invention.

In the detector 412 in FIG. 4, the pixels of the digital pattern information 413 and the pixels 414 of the detector are shifted by half of a pitch respectively and pixels 414 of the detector are disposed on the borders of the pixels to which the digital pattern information is adjacent. In this arrangement, pixel 414 of the detector detects whether or not the attributes of the adjacent pixels in the digital pattern information 413 match one another. For example, when the pixel of the spatial light modulator modulates the intensity of light to "1" and "0", if the light intensity of the ON pixel is "1", the detector disposed on the borders where ON pixels are adjacent to each other detects the intensity "1", and the pixel of the detector disposed on the border where OFF pixels are adjacent to each other detects the intensity "0". However, any of them will reproduce digital information "0". The detector disposed on the border where the ON pixel and the OFF pixel are adjacent to each other detects an intensity of "0.5" and reproduces the information "1". Thus, if the pixel of the detector is disposed on the border where the pixels in the digital pattern information are adjacent to each other, digital information can be directly obtained without performing a comparison operation on the attributes of the adjacent pixels and the transfer rate can be increased.

Figure 5:
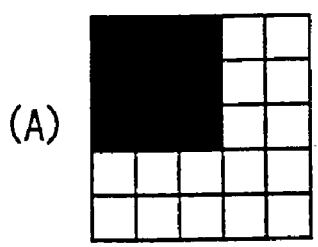
FIG. 5 is another example of digital pattern information according to the present invention.
Figure 5:
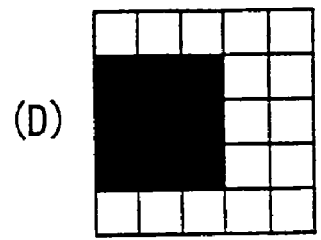
Figure 5:
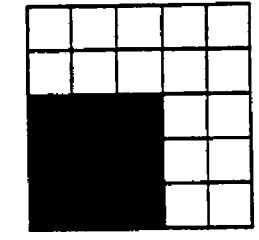
Figure 5:
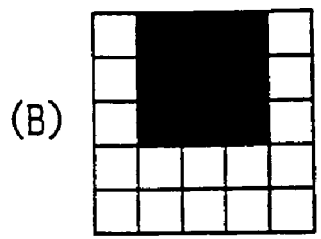
Figure 5:
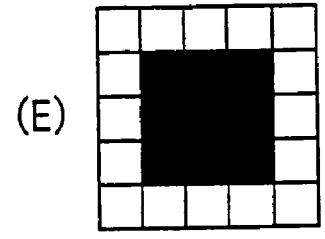
Figure 5:
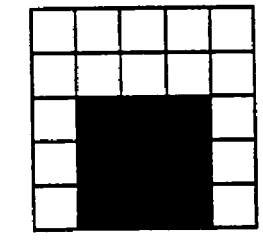
Figure 5:
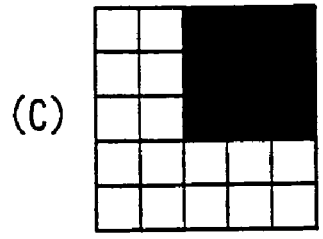
Figure 5:
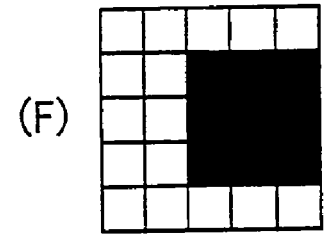
Figure 5:
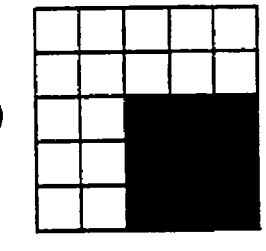

As another embodiment of digital pattern information displayed in the spatial light modulation, digital information that is recorded can be expressed by disposing a pixel group comprising a plurality of pixels wherein the attributes consecutively match within a predetermined area of the spatial light modulator. FIG. 5 is one example. In FIG. 5, the continuous constant is 3 and the pixel pitch is ⅓ of the convention pixel pitch, as in FIG. 1(B). In addition, digital information is expressed by the disposal of a pixel group of 3×3, wherein the attributes are the same, within an area of 5×5 pixels. Because the pixel group 3×3 is the same size as one pixel of the conventional spatial light modulation, spatial frequency of the information light is not increased.

In FIG. 5, the pixel group of 3×3 is disposed in the upper left of the pixel 5×5 in FIG. 5(A), the upper center in (B), the upper right in (C), the center left in (D), the center in (E), the center right in (F), the lower left in (G), the lower center in (H), and the lower right in (I). Thus, nine states can be displayed in the area of 5×5 pixels and approximately three bits of information can be expressed.

Figure 6:
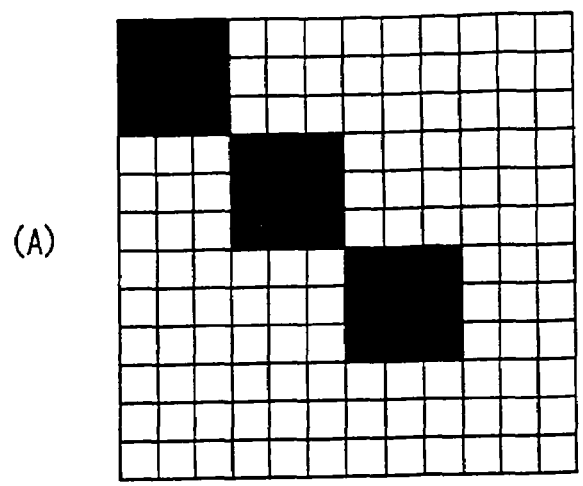
FIG. 6 is another example of digital pattern information according to the present invention.
Figure 6:
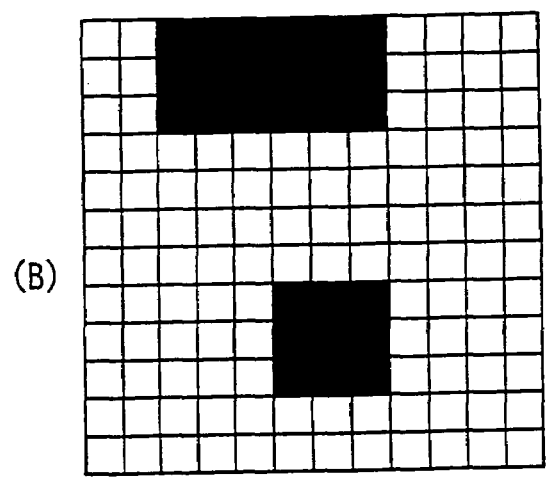
Figure 6:
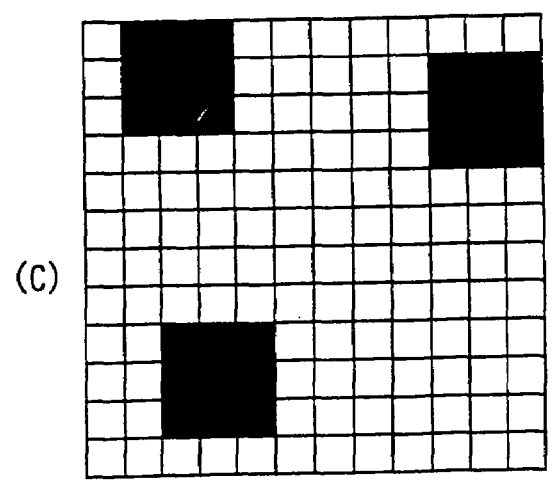

In FIG. 6, digital information is displayed by disposing three pixel groups 3×3 in the area of 12×12 pixels so as to express to more digital information. FIGS. 6(A), (B), and (C) is one example of the placement of pixels. In this way, more digital information can be displayed further if plural pixel groups are disposed, because they can be identified by not only the position of one pixel group but also the placement of the entire pixel group. Spatial frequency is not increased even if the pixel groups placed adjacent to each other, as in FIG. 6(B). In addition, the pixel groups need not be positioned in the same line or in the same row, as in FIG. 6(C).

In a recording method such as this, a significantly larger number of digital information can be expressed, in comparison with the conventional method, and recording density and transfer rate can be enhanced. Furthermore, this method is preferable because the white rate can be kept constant.

An optical information recording/reproducing device which performs the recording method and the reproduction method according to the present invention is explained below by using FIG. 7 to FIG. 13.

Figure 7:
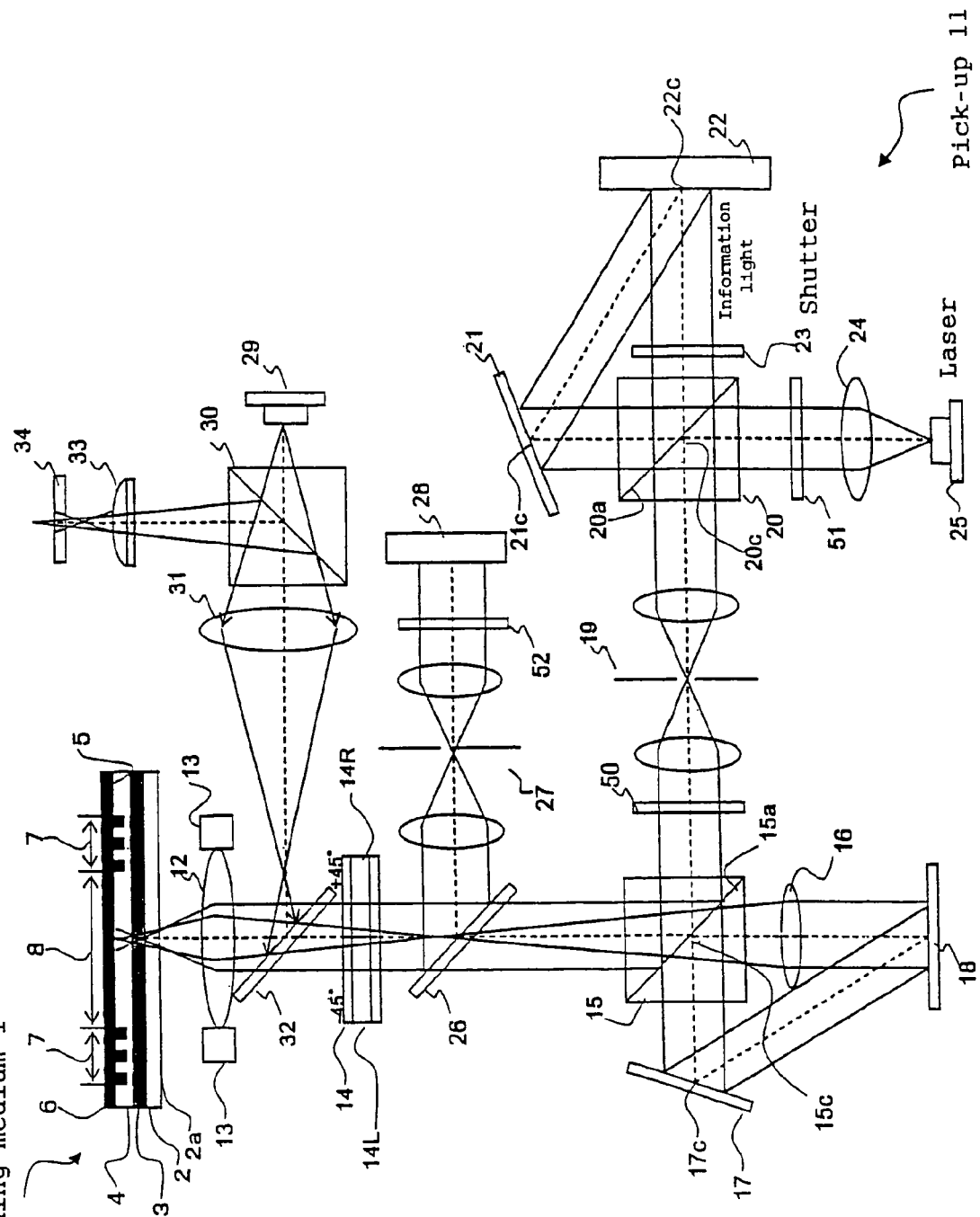
FIG. 7 is an explanatory diagram showing the configuration of pick-up and optical information recording medium in an optical information recording/reproducing device in an embodiment according to the present invention.

FIG. 7 is an explanatory diagram showing the configuration of the optical information recording/reproducing device in an embodiment according to the present invention. The optical information recording/reproducing device includes the optical information recording device and the optical information reproducing device. In addition, although in the embodiment according to the present invention an optical disk is used as an optical information recording medium 1, a card-shaped recording medium can be also used. Furthermore, the optical information recording/reproducing device comprises a pick-up 11.

First, a configuration of the recording medium 1 is described in reference to FIG. 7. The recording medium 1 comprises a hologram recording layer 3 as the information recording layer wherein information is recorded through the use of volume holography, an adhesive layer 4, a reflection film 5, and a substrate (protective layer) 6 which are laminated in this sequential order onto the surface of a disc-like transparent substrate 2 formed of polycarbonate or the like.

Reflection film 5 is a film which reflects light (reference light for reproduction and the like). Reflection film 5 is formed, for example, from aluminum. Substrate (protective layer) 6 is, for example, a substrate with an address formed by injection. The substrate (the protective layer) 6 is provided with an address servo area 7 and a data area 8. The light radiation position to the recording medium 1 can be servo-controlled. Information which is recorded to the recording medium 1 can be written to the data area 8 in the form of holography. Information for performing focus servo and tracking servo by the sampled servo system and address information are prerecorded by the emboss pit or the like in the address servo area 6. Focus servo can be performed by utilizing the reflection surface of the reflection film 5. For example, the wobble pit can be used as information for performing tracking servo. The transparent substrate 2 is determined to have, for example, a suitable thickness of 0.6 mm or less and the hologram layer 3 is determined to have, for example, a suitable thickness of 10 μm or thicker. The hologram layer 3 is formed of a hologram material whose optical characteristics such as refractive index, dielectric constant, and reflectance ratio vary with light intensity when light is radiated thereto. For example, Photopolymer HRF-600 (product name) by Dupont or the like is used as the hologram material. The reflection film 5 is formed of aluminum, for example.

Next, the configuration of the optical information recording/reproducing device in the embodiment according to the present invention is described. An optical information recording/reproducing device 10 comprises a spindle 81 onto which the optical information recording medium 1 is attached, a spindle motor 82 for rotating the spindle 81, and a spindle servo circuit 83 for controlling the spindle motor 82 so as to enable revolution speed of the optical information recording medium 1 to maintain a predetermined value. The optical information recording/reproducing device 10 further comprises pick-up 11 for radiating information light and reference light for recording to the optical information recording medium 1 to record information and for radiating reference light for reproduction to the optical information recording medium 1 to detect the reproduction light for reproducing the information recorded in the optical information recording medium 1, and a drive 84 for enabling pick-up 11 to move in the radial direction of the optical information recording medium 1.

The optical information recording/reproducing device 10 further comprises a detector 85 for detecting focus error signal FE, tracking error signal TE, and the reproduction signal RF from the signals output from the pick-up 11, a focus servo circuit 86 for performing focus servo by driving an actuator within the pick-up 11 to move the object lens in the direction of thickness of the optical information recording medium 1 based on the focus error signal FE detected by the detector 85, a tracking servo circuit 87 for performing tracking servo by driving the actuator within the pick-up 11 to move the object lens in the radial direction of the optical information recording medium 1 based on the tracking error signal TE detected by the detector 85, and a slide servo circuit 88 for performing slide servo by controlling the drive 84 to move the pick-up 11 in the radial direction of the optical information recording medium 1 based on commands from the tracking error signal TE and the controller described later.

The optical information recording/reproducing device 10 further comprises a signal processing circuit 89 for encoding information that is recorded by the afore-mentioned method, for reproducing information recorded in data area 7 of the optical information recording medium 1 by decoding the data output from the detector within the pick-up 11, and for reproducing the basic clock and judging address from the reproduction signal RF from the detector 85, a controller 90 for controlling the entire optical information recording/reproducing device 10, and an operation section 91 for giving various instructions to the controller 90. The controller 90 is designed to input the basic clock and the address information output from the signal processing circuit 89 and to control the pick-up 11, the spindle servo circuit 83, the slide servo circuit 88 and the like. The spindle servo 83 is designed to input the basic clock output from the signal processing circuit 89. The controller 90 comprises CPU (central processing unit), ROM (read only memory) and RAM (random access memory), and is designed to realize the functions of the controller 90 by allowing CPU to execute the program stored in ROM with RAM as a working area.

The pick-up 11 radiates reference light and information light to the optical information recording medium 1 and receives reproduction light from the optical information recording medium 1. The pick-up 11 comprises an object lens 12, an actuator 13, a divided-by-two optical rotatory plate 14, a polarized beam splitter 15, a lens 16, a mirror 17, a mirror 18, a spatial filter 19, a polarized beam splitter 20, a mirror 21, a spatial light modulator (information expression means) 22, a shutter 23, a collimator lens 24, a laser beam source 25, a half mirror 26, a spatial filter 27, an optical detector 28, half wavelength plates 50 and 51, and the polarizing plate 52.

The pick-up 11 further comprises a servo light source device 29, a beam splitter 30, a lens 31, a dichroic mirror 32, a cylindrical lens 33 and a divided-by-four photo detector 34.

Information light is light carrying information that is to be recorded. In FIG. 1, information light is a laser beam radiated from the laser beam source 25, modulated by the spatial light modulator 22, and radiated to the recording medium 1. In addition, reference light comprises a reference light for recording which interferes with information light to form a holography and a reference light for reproduction which reproduces information from the holography.

Furthermore, reproduction light is light which returns to the pick-up 11 from the recording medium 1 if the reference light for reproduction is radiated to the recording medium 1. The reproduction light is light which carries the reproduced information from the optical information recording medium 1.

The objective lens 12 is positioned on the transparent substrate 2-side of the recording medium 1. Reference light and information light are radiated to the recording medium 1 through the object lens 12. Reproduction light from the recording medium 1 passes through the object lens 12 and advances towards the half mirror 26.

The actuator 13 is designed to move the object lens 12 in the direction of thickness and in the radial direction of the optical information recording medium 1.

The divided-by-two optical rotatory plate 14 has an optical plate 14L disposed on the left side of the optical axis and an optical plate 14R disposed on the right side of the optical axis in FIG. 4. The optical direction of the light which passes through the optical plate 14L is designed to be rotated at angle of −45° and the optical direction of the light which passes through the optical plate 14R is designed to be rotated at +45°.

The half mirror 26 enables information light to pass through and to advance towards the divided-by-two optical rotatory plate 14, and reflects the reproduction light enabling it to advance towards the spatial filter 27. The spatial filter 27 receives the reproduction light from the half mirror 26, eliminates extra light, and enables the light to radiate to the optical detector 28.

The optical detector 28 receives and detects the reproduction light, thereby enabling reproduction of the information recorded in the optical information recording medium 1.

The laser beam source 25 generates the laser beam. The laser beam is the source of information light and reference light. The collimator lens 24 receives the laser beam from the laser beam source 25 and turns it into a parallel light. The half wavelength plate 51 receives the parallel light from the collimator lens 24 and turns it into a P polarized light and an S polarized light. The optical beam splitter 20 receives the P polarized light and the S polarized light from the half wavelength plate 51 and enables the P polarized light to pass through and reflects the S polarized light on the reflection surface 20a. The transmitted P polarized light advances towards the mirror 21, and the reflected S polarized light advances towards the spatial filter 19. The P polarized light becomes the source of information light and the S polarized light becomes the source of reference light. The mirror 21 receives the P polarized light and reflects the light towards the spatial light modulator 22.

The spatial light modulator (information expression means) 22 generates the spatially modulated information light reflecting the P polarized light from the mirror 21 by controlling the attributes per pixel 22c. The generated information light permeates the shutter 23 and the optical beam splitter 20 and advances towards the spatial filter 19. The spatial light modulator 22 can use DMD and the reflective LCD panel. DMD can express information based on the direction in which the radiated light is reflected by controlling the mirror provided at the pixels. The reflective LCD panel can express information by the intensity, polarization, or phase or the like of the radiated light by controlling the orientation of the liquid crystal per pixel. In other words, the radiated light can be spatially modulated.

Figure 12:
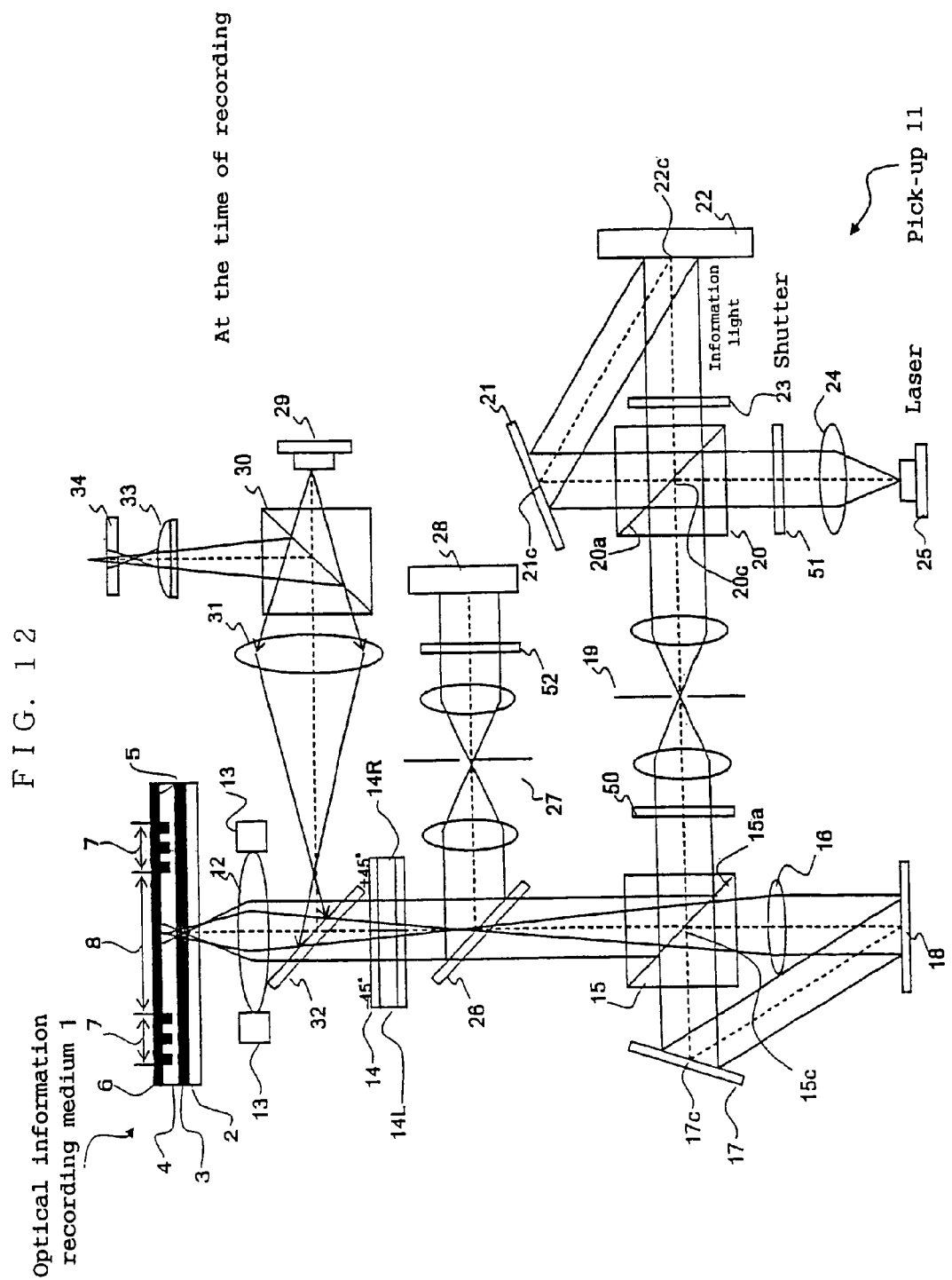
FIG. 12 is an explanatory diagram showing the state during the recording of the pick-up shown in FIG. 7.

The shutter 23 is opened when information is recorded in the recording medium 1 and is closed when information is reproduced from the recording medium 1 (see FIG. 12). The spatial filter 19 comprises a pair of the lenses and a diaphragm, receives information light and the optical beam splitter 20 from the spatial light modulator 22, and produces an image on the diaphragm. Then, the diffracted light closest to the optical axis out of the diffracted lights in the information light permeates the hole of the diaphragm. However, the diffracted light far from the optical axis out of the diffracted lights cannot permeate the diaphragm. The half wavelength plate 50 converts the S polarized light reflected by the reflection surface 20a of the optical beam splitter 20 into P polarized light, which becomes the reference light.

The polarized beam splitter 15 reflects information light on the reflection surface 15a and allows the light to advance towards the half mirror 26. In addition, the light permeates the reference light and advances towards the mirror 17. The mirror 17 reflects the reference light towards the mirror 18 facing the recording medium 1. The mirror 18 reflects the reference light and allows the light to advance towards lens 16. The lens 16 inflects the reference light so as to focus before the spatial light modulator 1.

Figure 9:
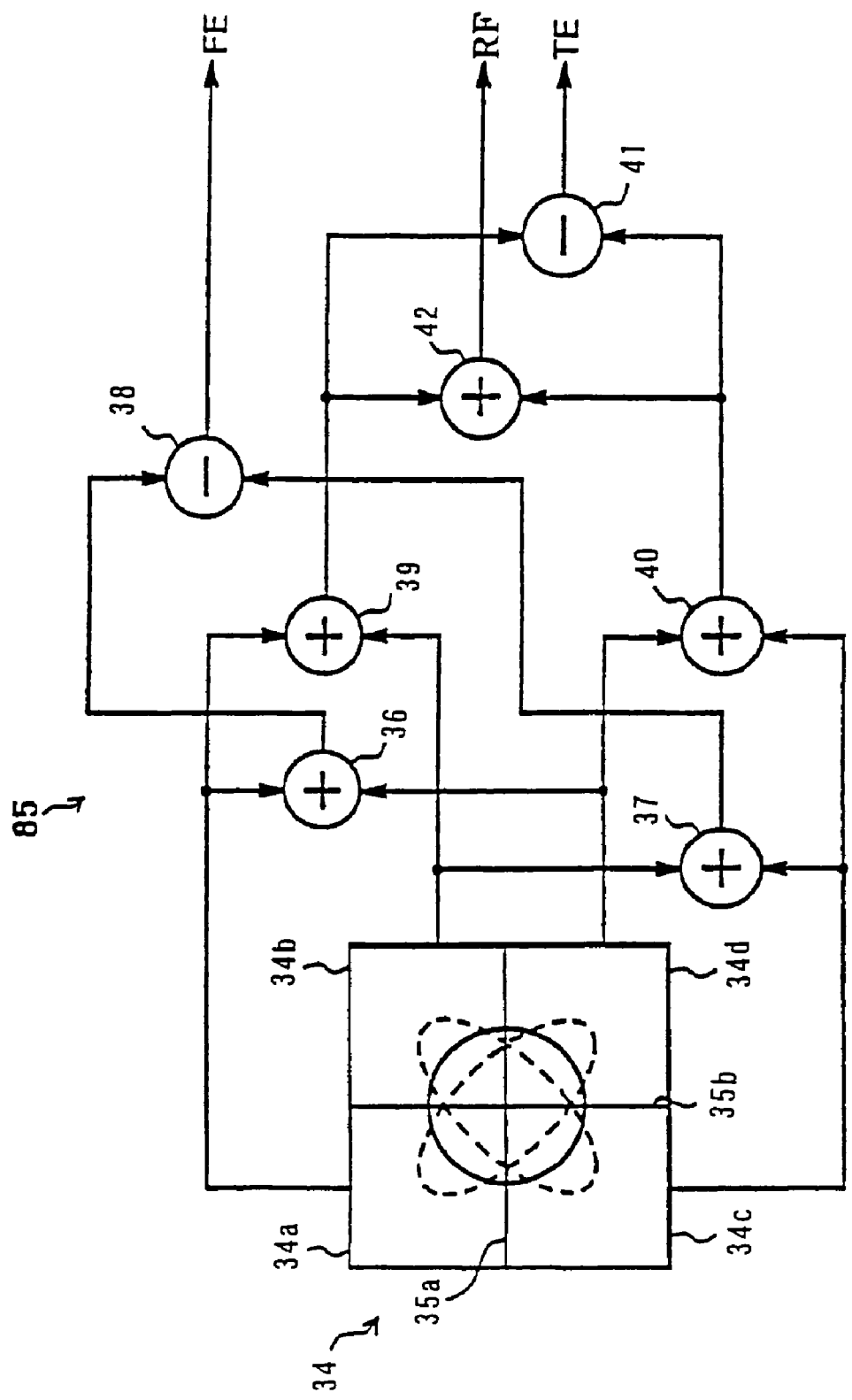
FIG. 9 is a block diagram showing the configuration of a detector in FIG. 8.

As shown in FIG. 9, the divided-by-four photo detector 34 has four light receiving sections from 34a to 34d which is divided by a dividing line 35a in parallel with the direction corresponding to the track direction in the optical information recording medium 1 and a dividing line 35b in the direction intersecting therewith. The cylindrical lens 33 is disposed so as to allow the central axis of the cylindrical surface to create 450 angles with the dividing lines 35a and 35b of the divided-by-four photo detector 34.

FIG. 9 is a block diagram showing configuration of the detector 85 for detecting the focus error signal FE, the tracking error signal TE and the reproduction signal RF based on the output of the divided-by-four photo detector 34. This detector 85 comprises an adder 36 for adding each output of the light receiving sections 34a and 34d diagonal to the divided-by-four photo detector 34, an adder 37 for adding each output of the light receiving sections 34b and 34c diagonal to the divided-by-four photo detector 34, a subtracter 38 for operating the difference between the output from the adder 36 and the adder 37 to generate the focus error signal FE by the astigmatic method, an adder 39 for adding each output of the adjacent light receiving sections 24a and 34b along the track direction of the divided-by-four photo detector 34, an adder 40 for adding each output of the adjacent light receiving sections 34c and 34d along the track direction of the divided-by-four photo detector 34, a subtracter 41 for operating the difference between the output from the adder 39 and the adder 40 to generate the tracking error signal TE by the push-pull method, and an adder 42 for adding the outputs of the adder 39 and the adder 40 to generate the reproduction signal RF. In this embodiment, the reproduction signal RF is a signal wherein information recorded in the address servo area 7 in the optical information recording medium 1 is reproduced.

Figure 8:
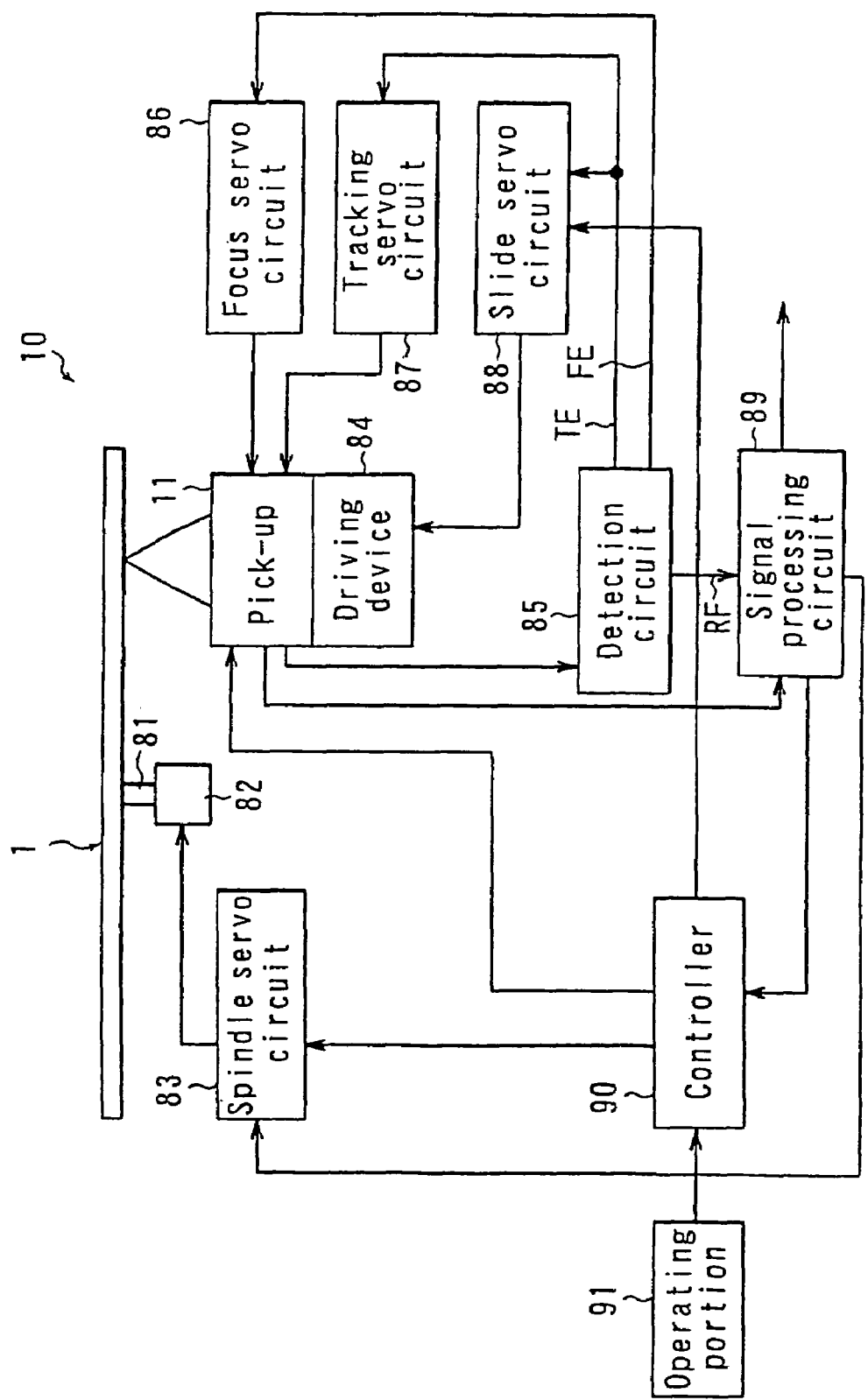
FIG. 8 is a block diagram showing the entire configuration of an optical information recording/reproducing device in an embodiment according to the present invention.

The spatial light modulator 22 within the pick-up 11 is designed to be controlled by the controller 90 shown in FIG. 8. The controller 90 is designed to display digital information encoded by the signal processing circuit 89 in the spatial light modulator 22.

The operations of the optical information recording/reproduction device in this embodiment is divided into operation at the time of servo, operation at the time of recording, and operation at the time of reproduction and explained below in sequential order. In any time, whether it is at the time of servo, the recording, or the reproduction, the optical information recording medium 1 is rotated by the spindle motor 82 so as to keep the prescribed speed of revolution.

Figure 10:
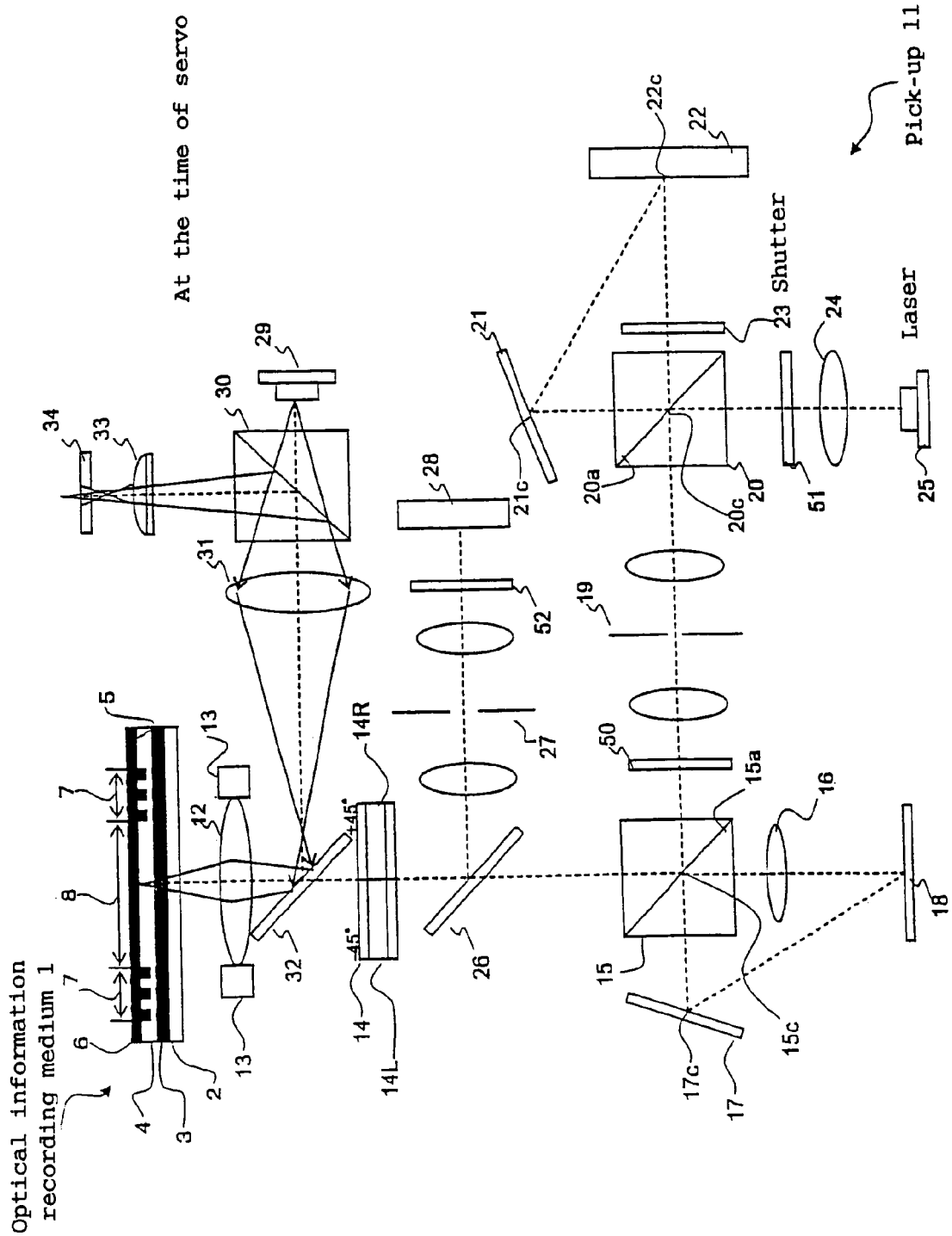
FIG. 10 is an explanatory diagram showing the state during the servo of the pick-up shown in FIG. 7.

First, the operation at the time of servo is described in reference to FIG. 10. At the time of servo, the servo laser is radiated from the servo laser beam device 29. The controller 90 predicts the timing in which the radiated light of the object lens 12 passes through the address servo area 7 based on the basic clock reproduced by the reproduction signal RF, and maintains the afore-mentioned setting while the radiated light of the object lens 12 passes through the address servo area 7.

The light radiated from the servo optical source device 29 passes through the beam splitter 30, is inflected by the lens 31, is reflected by the dichroic mirror 32 towards the object lens 12, is concentrated by the object lens 12, and is radiated to the information recording medium 1. This light is reflected by the reflection film 5 of the optical information recording medium 1, is then modulated by the emboss pit in the address servo area 7, and returned to the object lens 12.

The dichroic mirror 32 reflects the wavelength of the laser from the servo light source 29 and allows the wavelength of the laser from the recording/reproducing device light source 25 to pass. For example, if the mirror is designed to reflect the light of wavelength λ=655 nm and to allow the light of wavelength λ=655 nm or less to pass, the red laser of 655 nm can be used as the servo light source, and the green laser, the violet laser, the blue laser and the like of wavelength λ=532 nm or less can be used as the recording/reproducing light source 25.

After the returned light from the optical information recording medium 1 passes though the object lens 12, is reflected by the dichroic mirror 32, is reflected by the beam splitter 30, and passes through the cylindrical lens 33, the light is detected by the divided-by-four photo detector 34. Then, the focus error signal FE, the tracking error signal TE and the reproduction signal RF are generated by the detection circuit shown in FIG. 9 based on the output of the divided-by-four photo detector, and based on these signals, the focus servo and the tracking servo are performed and the reproduction of the basic clock and the judgment of addresses are performed.

In the settings at the time of servo, above, the configuration of the pick-up 11 is the same as in that of the pick-up for recording and reproduction of ordinary optical disks such as CD (compact disk), DVD (digital video disk or digital versatile disk), and HS (hyper storage disk). Therefore, the optical information recording/reproducing device 10 according to the embodiment can be also configured to be compatible with ordinary optical disk devices.

Figure 11:
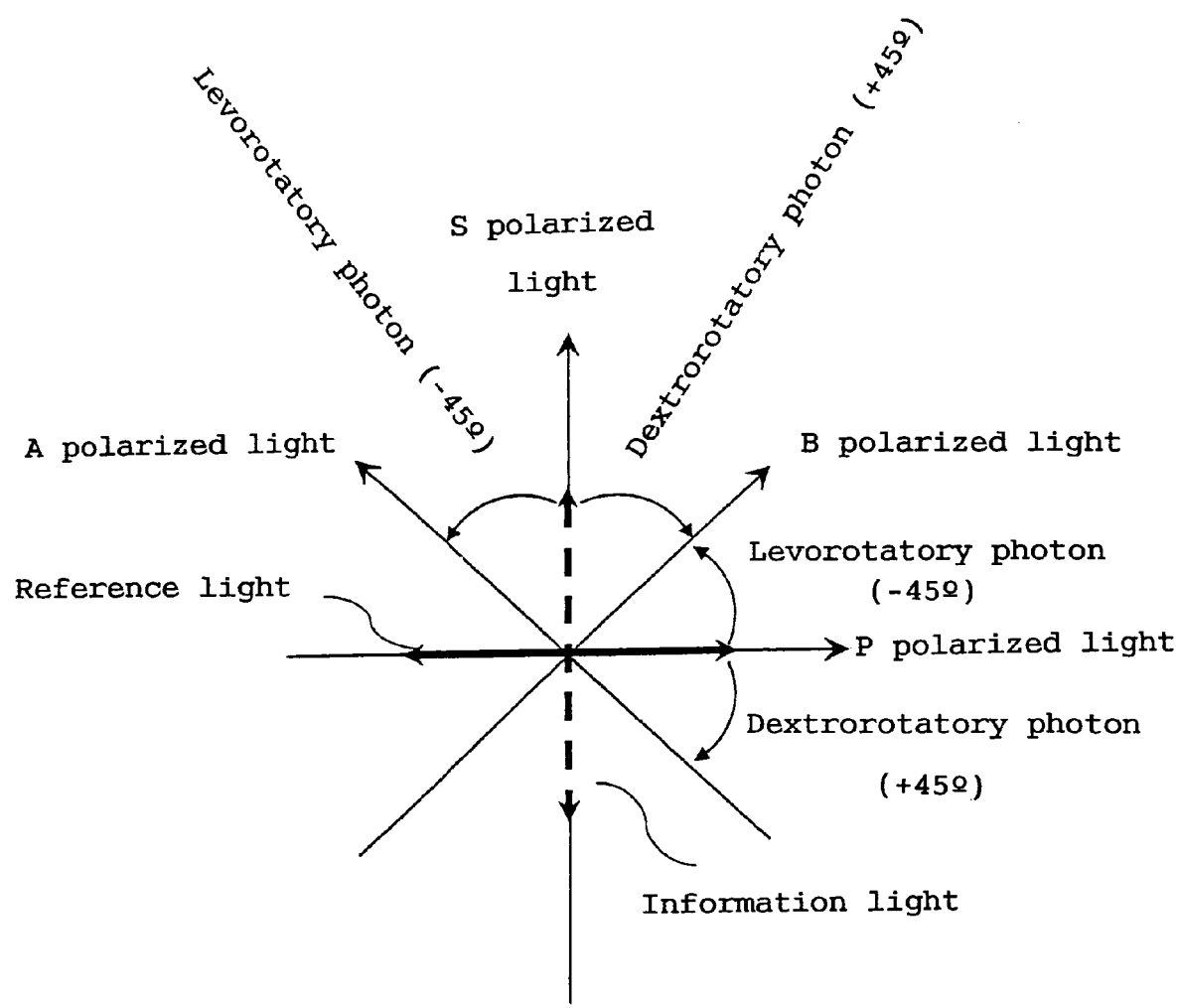
FIG. 11 is an explanatory diagram explaining polarized light used in an embodiment according to the present invention.

Here, the A polarized light and the B polarized light used in later descriptions are defined as follows. Namely, as shown in FIG. 11, A polarized light is determined to be a linear polarized light wherein the polarization direction of S polarized light is rotated to a −45° angle or that of P polarized light is rotated to a +45° angle. B polarized light is determined to be a linear polarized light wherein the polarization direction of S polarized light is rotated to a +45° angle or that of P polarized light is rotated to a −45° angle. The polarization direction of A polarized light and B polarized light are mutually perpendicular. S polarized light is a linear polarization wherein the polarization direction is vertical to the plane of incidence (paper plane in FIG. 7), and P polarization is a liner polarization wherein the polarization direction is parallel to the plane of incidence.

Next, the operation at the time of recording is described. FIG. 12 is an explanatory diagram showing the state of pick-up 11 at the time of recording. When recording, the controller 90 expresses information which is recorded by the matching or mismatching of the attributes of the adjacent pixels in the spatial light modulator 22 and displays digital pattern information in the spatial light modulator 22. It is preferable that the information that is recorded is encoded in according to a predetermined condition by the signal processing circuit 89.

The output of the radiated light in the light source device 25 becomes high output for recording, in terms of pulse. The controller 90 predicts the timing in which the radiated light of the object lens 12 passes through the data area 8 based on the basic clock reproduced by the reproduction signal RF, and maintains the afore-mentioned setting while the radiated light of the object lens 12 passes through the data area 8. The focus servo and tracking servo are not implemented and the object lens 12 is fixed, while the radiated light of the object lens 12 passes through the data area 8.

As shown in FIG. 12, light radiated from the light source device 25 is changed into a parallel light beam by the collimator lens 24, and is changed to the P polarized light and the S polarized light by the half wavelength plate 51. The polarized beam splitter 20 receives the P polarized light and the S polarized light, allows the P polarized light to pass and reflects the S polarized light on the reflection surface 20a. The transmitted P polarized light advances towards the mirror 21 and the reflected S polarized light advances towards the spatial filter 19. This P polarized light is the source of information light and the S polarized light is the source of reference light.

The P polarized light is reflected by the mirror 21 towards the spatial light modulator 22, and is spatially modulated by the digital pattern information displayed in the spatial light modulator 22 to become information light. This information light passes through the shutter 23 and the polarized beam splitter 20, and advances towards the spatial filter 19. Then, the light is changed to S polarized light by the half wavelength plate 50, reflected on the reflection surface 15a of the polarized beam splitter 15 and passes through the divided-by-two optical rotatory plate 14. Here, the polarization direction of the light which permeated the optical rotatory plate 14L of the divided-by-two optical rotatory plate 14 is rotated to an angle of −45°, and becomes the light of the A polarized light. The polarization direction of the light which permeated the optical rotatory plate 14R of the divided-by-two optical rotatory plate 14 is rotated to an angle of +45°, and becomes the light of the B polarized light. Information light which permeated the divided-by-two optical rotatory plate 14 is concentrated by the object lens 12 and is radiated to the optical information recording medium 1 so as to converge on the reflection film 5 in the optical information recording medium 1.

On the other hand, the S polarized light reflected by the polarized beam splitter 20a passes through spatial filter 19 and is changed to P polarized light by the half wavelength plate 50. Then, the light passes through the polarized beam splitter 15, advances towards the mirror 17, and is reflected by the mirror 17 towards the mirror 18. The mirror 18 reflects the reference light for recording and transmits this light towards the lens 16, whereby the lens 16 inflects the reference light for recording so as to allow it to focus before the recording medium 1. The reference light for recording passes through the polarized beam splitter 15 and further passes through the divided-by-two optical rotatory plate 14. Here, the polarization direction of the light which permeated the optical rotatory plate 14L of the divided-by-two optical rotatory plate 14 is rotated to an angle of −45°, and becomes the light of the B polarized light. The polarization direction of the light which permeated the optical rotatory plate 14R of the divided-by-two optical rotatory plate 14 is rotated to an angle of +45°, and becomes the light of the A polarized light. The reference light for recording which permeated the divided-by-two optical rotatory plate 14 is concentrated by the object lens 12, radiated to the optical information recording medium 1, and after the light converges to its minimum diameter before the reflection film 5, the light passes through the hologram layer 3 while the light is diverged.

The information light which has passed through the optical rotatory plate 14L of the divided-by-two optical rotatory plate 14 becomes the light of the A polarized light and interferes with the reference light for recording of the A polarized light which has passed through the optical rotatory plate 14R of the divided-by-two optical rotatory plate 14 to form an interference pattern, and when the output of the radiated light of the light source device 25 reaches high output, the interference pattern is recorded inside the hologram layer 3 by volume. In addition, information light which has passed through the optical rotatory plate 14R of the divided-by-two optical rotatory plate 14 becomes the light of the B polarized light and interferes with the reference light for recording of the B polarized light which has passed the optical rotatory plate 14L of the divided-by-two optical rotatory plate 14 to form an interference pattern, and when the output of the radiated light of the light source device 25 reaches high output, the interference pattern is recorded inside the hologram layer 3 by volume.

In this embodiment according to the present invention, the optical axis of the information light and the optical axis of the reference light for recording passes through 20c so as to be disposed on the same line in the polarized beam splitter 20, and passes through 15c so as to be disposed on the same line in the polarized beam splitter 15. Then, the information light and the reference light for recording are radiated to the hologram layer 3 from the same surface side.

Figure 13:
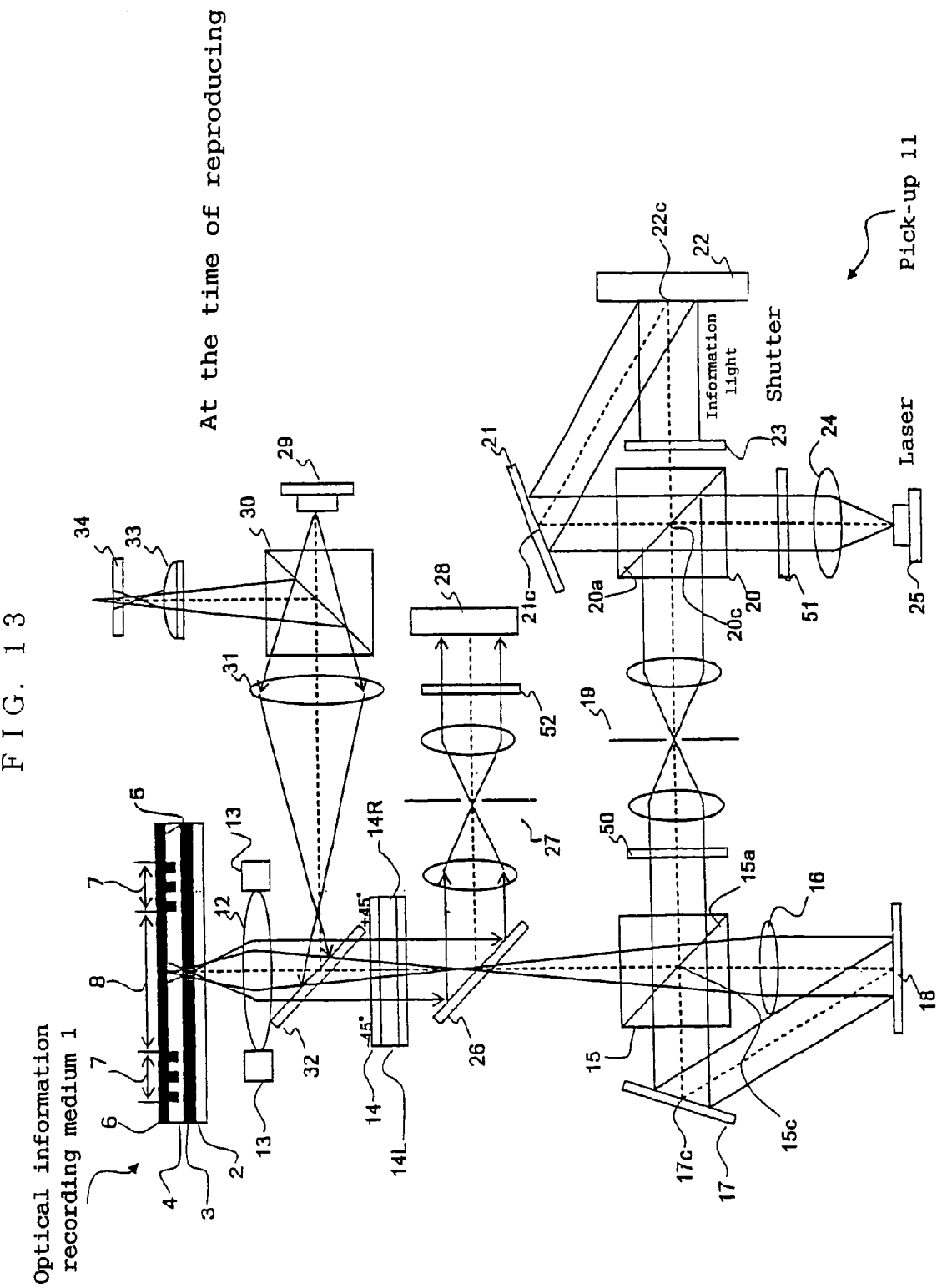
FIG. 13 is an explanatory diagram showing the state during the reproduction of the pick-up.

Furthermore, the operation at the time of the reproduction is described in reference to FIG. 13. When reproducing, the output of the radiated light in the light source decide 25 is changed to low output for reproduction, the shutter 23 is closed, and the light which permeated the polarized beam splitter 20 is blocked. The controller 90 predicts the timing in which the radiated light from the object lens 12 passes through the data area 8 based on the basic clock reproduced from the reproductive signal RF, and maintains the aforementioned setting while the radiated light from the object lens 12 passes through the data area 8. Focus servo and tracking servo are not performed and the objective lens 12 is fixed while the radiated light of the object lens 12 passes through the data area 8.

As shown in FIG. 13, the light radiated from the light source device 25 is changed to a parallel light by the collimator lens 24, and is further changed to the P polarized light and the S polarized light by the half wavelength plate 51. The polarized beam splitter 20 receives the P polarized light and the S polarized light from the half wavelength plate 51, P polarized light is allowed to pass through the splitter, and the S polarized light is reflected by the reflection surface 20a.

The S polarized light reflected by the polarized beam splitter 20a passes through the spatial filter 19 and is changed to the P Polarized light by the half wavelength plate 50. Then, the light passes through the polarized beam splitter 15, advances towards the mirror 17, and is reflected by the mirror 17 towards the mirror 18. The mirror 18 reflects the reference light for reproduction and allows the light to advance to the lens 16, and the lens 16 inflects the reference light for reproduction so as to allow the same to focus before the recording medium 1. The reference light for reproduction passes through the polarized beam splitter 15, and further passes through the divided-by-two optical rotatory plate 14. Here, the polarization direction of the light which permeated the optical rotatory plate 14L of the divided-by-two optical rotatory plate 14 is rotated to an angle of +45°, and becomes the light of the A polarized light. The polarization direction of the light which permeated the optical rotatory plate 14R of the divided-by-two optical rotatory plate 14 is rotated to an angle of −45°, and becomes the light of the B polarized light. The reference light for recording which passed through the divided-by-two optical rotatory plate 14 is concentrated by the object lens 12, is radiated to the optical information recording medium 1, and after the light converges so as to allow minimum diameter before the reflection film 5, the light permeates the hologram layer 3 while the light is diverged.

The reference light for reproduction which has passed through the optical rotatory plate 14L of the divided-by-two optical rotatory plate 14 becomes the light of the A polarized light, and generates the reproduction light corresponding to the information light which has passed through the optical rotatory plate 14R of the divided-by-two optical rotatory plate 14 at the time of the recording from the hologram layer 3. In addition, the reference light for reproduction which has passed through the optical rotatory plate 14R of the divided-by-two optical rotatory plate 14 becomes the light of the B polarized light, and generates the reproduction light corresponding to the information light which has passed through the optical rotatory plate 14L of the divided-by-two optical rotatory plate 14 at the time of the recording from the hologram layer 3.

These reproduction lights advance to the side of the object lens 12 and are changed to parallel laser beams by the object lens 12, whereby the beams pass through the divided-by-two optical polarized rotatory plate 14 and is partially reflected by the half mirror 26. The extra components such as the reflected light of the reference light for reproduction is removed from the reflected reproduction light by the spatial filter 27, the reproduction light passes through the polarized plate 52 and enters the detector 28. The detector is provided with grid-form pixels, and the reproduction light is detected therein.

In this embodiment according to the present invention, the radiation of the reference light for reproduction and the concentration of the reproduction light are performed from the same side of the hologram layer 3 so as to allow the optical axis of the reference light for reproduction and the optical axis of the reproduction light to be disposed on the same line.

The method of recording, the method of reproduction and the method of recording/reproducing according to the present invention are not limited to those of the aforementioned optical information recording/reproducing device, but can be implemented in all optical information recording devices and optical information recording/reproducing devices wherein information is recorded by utilizing information light spatially modulated by the spatial light modulator and all optical information reproducing devices and optical information recording/reproducing device wherein information is reproduced from information from recording mediums to which information is recorded by utilizing information light spatially modulated by the spatial light modulator.

For example, in the optical information recording/reproducing device, above, only information light is spatially modulated. However, multiplex recording can be performed even if the reference light for recording is spatially modulated as well (described in detail in Japanese Patent Laid-Open Publication No. 11-311938). In this case, the pattern which spatially modulates the reference light can also carry the information, and information carried by this pattern may be expressed by the matching or mismatching of the attributes of adjacent pixels or may be expressed by the placement of pixels with the same attributes.

In addition, in the optical information recording/reproducing device, above, although information light and reference light for recording are generated by separation through the polarized beam splitters 20 and 15, information light and reference light for recording can be also generated by the pattern of the spatial light modulator 22 without separation.

What is claimed is:

1. An information recording method wherein information is recorded to a recording medium by utilizing an interference pattern formed by the interference between an information light, which is spatially modulated by digital pattern information displayed in a spatial light modulator which has a large number of pixels, and reference light for recording, wherein:

digital information that is recorded is digital pattern information and expressed by the matching or mismatching of the attributes of adjacent pixels in said spatial light modulator wherein:

if the attributes of the adjacent pixels match each other, one of the digital information "0" and "1" is expressed; and if the attributes of the adjacent pixels do not match each other, another one of the digital information "0" and "1" is expressed.

2. An information recording method according to claim 1, wherein said digital information is expressed by a plurality of pixels aligned in one-dimension of said spatial light modulator.

3. An information recording method according to claim 2, wherein said spatial light modulator has a large number of pixels ranged in a grid, and plural digital pattern information expressed by a plurality of the pixels aligned in said one-dimension are combined to be displayed as two-dimensional digital pattern information.

4. An information recording method according to any of claims 1 to 3, wherein said digital pattern information is such that a pixel whose attribute does not match that of one adjacent pixel is displayed so as to invariably have a pixel whose attribute matches on the other end.

5. An information recording method according to claim 1, wherein said digital pattern information is such that a pixel whose attribute does not match that of one adjacent pixel is displayed so as to invariably have a certain number or more of consecutive pixels whose attributes match on the other sides.

6. An information reproducing method in which information is reproduced from a recording medium wherein information is recorded by utilizing an interference pattern formed by the interference between an information light, which is spatially modulated by digital pattern information displayed in a spatial light modulator which has a large number of pixels, and reference light for recording, wherein:

a reference light for reproduction is radiated to the recording medium to generate a reproduction light by which said digital pattern is carried;

the matching and mismatching of the attributes of adjacent pixels in the digital pattern information of the reproduction light are detected;

if the attributes of the adjacent pixels match each other, one of the digital information "0" and "1" is expressed; and if the attributes of the adjacent pixels do not match each other, another one of the digital information "0" and "1" is expressed.

7. An information reproducing method according to claim 6, where a detector for detecting reproduction light has a plurality of pixels, and the pixels of the detector are disposed on a border of adjacent pixels in said digital pattern information.

8. An information reproducing method according to claim 6 or 7, wherein digital pattern information of said reproduction light is expressed by a plurality of pixels aligned in one dimension of said spatial light modulator.

9. An information recording/reproducing method wherein information is recorded to a recording medium by utilizing an interference pattern formed by interference between an information light, which is spatially modulated by digital pattern information displayed in a spatial light modulator which has a large number of pixels, and a reference light for recording, and information is reproduced from a recording medium to which information is recorded, wherein:

digital information that is recorded is digital pattern information and expressed by the matching or the mismatching of the attributes between adjacent pixels in the spatial light modulator;

the reproduction light which carries digital pattern information is generated by irradiating the recording medium with a reference light for reproduction;

the matching and mismatching of attributes of adjacent pixels in the digital pattern information of the reproduction light are detected;

if the attributes of the adjacent pixels match each other, one of the digital information "0" and "1" is expressed; and if the attributes of the adjacent pixels do not match each other, another one of the digital information "0" and "1" is expressed.

10. An information recording/reproducing method according to claim 9, wherein said digital pattern information is expressed by a plurality of pixels disposed in one dimension of said spatial light modulator.

11. An information recording/reproducing method according to claim 10, wherein said spatial light modulator has a large number of pixels arranged as a grid and combines a plurality of digital pattern information expressed by a plurality of the pixels arranged in one dimension to display as two-dimensional pattern information.

12. An information recording/reproducing method according to any of claims 9 to 11, wherein said digital information is such that a pixel whose attribute does not match that of one adjacent pixel is displayed so as to invariably have a pixel whose attribute matches on die other end.

13. An information recording/reproducing method according to any of claims 9 to 11, wherein said digital information is such that a pixel whose attribute does not match that of one adjacent pixel is displayed so as to invariably have a certain number or more of consecutive pixels whose attributes match on the other sides.

14. An information recording/reproducing method according to any of claims 9 to 11, wherein the detector for detecting said reproduction light has a plurality of pixels and the pixels of said detector are disposed on the borders of adjacent pixels in said digital pattern information.

* * * * *